(12) United States Patent
Kawashima

(10) Patent No.: US 7,644,320 B2
(45) Date of Patent: Jan. 5, 2010

(54) LOG COLLECTING APPARATUS, IMAGE FORMING APPARATUS AND COMPUTER-READABLE STORAGE MEDIUM

(75) Inventor: Norimi Kawashima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 559 days.

(21) Appl. No.: 11/210,829

(22) Filed: Aug. 25, 2005

(65) Prior Publication Data

US 2006/0048004 A1 Mar. 2, 2006

(30) Foreign Application Priority Data

Aug. 30, 2004 (JP) ............................. 2004-250752
Aug. 19, 2005 (JP) ............................. 2005-238754

(51) Int. Cl.
*G06F 11/00* (2006.01)
(52) U.S. Cl. ...................................................... 714/46
(58) Field of Classification Search .................. 714/26, 714/44, 46
See application file for complete search history.

(56) References Cited

U.S. PATENT DOCUMENTS

| | | | | |
|---|---|---|---|---|
| 5,333,302 A | * | 7/1994 | Hensley et al. ................. | 714/37 |
| 6,122,675 A | * | 9/2000 | Fisher et al. ................. | 719/318 |
| 6,279,124 B1 | * | 8/2001 | Brouwer et al. ............... | 714/38 |
| 6,314,449 B1 | * | 11/2001 | Gallagher et al. ........... | 709/202 |
| 6,408,403 B1 | * | 6/2002 | Rodrigues et al. ............. | 714/38 |
| 6,795,935 B1 | * | 9/2004 | Unkle et al. ................... | 714/37 |
| 2003/0055809 A1 | * | 3/2003 | Bhat ............................. | 707/1 |
| 2003/0204590 A1 | * | 10/2003 | Torii ........................... | 709/224 |
| 2004/0025082 A1 | * | 2/2004 | Roddy et al. ................... | 714/25 |

FOREIGN PATENT DOCUMENTS

JP 2004-297777 10/2004

* cited by examiner

*Primary Examiner*—Scott T Baderman
*Assistant Examiner*—Yair Leibovich
(74) *Attorney, Agent, or Firm*—Oblon, Spivak, McClelland, Maier & Neustadt, L.L.P.

(57) ABSTRACT

A log collecting apparatus has a graphical user interface to allow an operator to select a target equipment that is a target of a log collection and logs that are to be collected, and a combination managing part. The combination managing part identifies related logs that are other than the logs selected on the user graphical interface and are related to the logs selected on the graphical user interface, and makes the related logs selectable on the graphical user interface.

18 Claims, 30 Drawing Sheets

Background Art
FIG.1

```
71 — C:¥>rsh 11.22.33.44 getlog 1000
     ● Tray information: tray no.0 size A4
     ● Initialize print information:■ Job no.601
     ● Notify job executing order JobId=601
72   ● Start printing:■Job start request Job no.601
     ● Update paper eject destination: Eject tray 1
     ● Start process execution
     ● Page information response  No. of pages 2, Paper direction vertical
     ● End print:■Job close request Job no.601
     ^C
73 — C:¥>rsh 11.22.33.44 getlog 2000
     Address [12345678].
             Daemon ID[3] Client ID:[4]
     Set parameters
     Access check: OK
     ^C
74 — C:¥>rsh 11.22.33.44 getlog 2001
     Start print Daemon
     Read print data  Time out: 300000 seconds
     ─────────────────────────────
     Set Socket
     Buffer size: 512 MB
     ^C
75 — C:¥>rsh 11.22.33.44 getlog 2002
     Start Print Daemon
     Spool unsupported
     Read print data  Time out: 300 seconds
     ^C
76 — C:¥>rsh 11.22.33.44 getlog 2003
     Check extended print ports
     On-line
```

FIG.3

| SELECTED LOG NO. | RELATED LOG NO. |
|---|---|
| 1000 | 2001, 2002 |
| 2000 | 1025, 2001 |
| 2001 | 1000, 1025, 2000 |
| 2002 | 2008 |

FIG.4

| LOG NO. | MEANING |
|---|---|
| 1000 | NETWORK RELATED (BASIC) LOG |
| 1025 | OPTIONAL PAPER SUPPLY TRAY RELATED LOG |
| 2000 | OPTIONAL PAPER EJECT TRAY RELATED LOG |
| 2001 | DUPLEX UNIT RELATED LOG |
| 2003 | NETWORK RELATED (TCP/IP) LOG |
| 2004 | SPOOL RELATED LOG |
| 2005 | PS RELATED LOG |
| 2006 | TIFF RELATED LOG |
| 2007 | JPEG RELATED LOG |
| 2008 | PRINT RELATED LOG |
| 4000 | ADF RELATED LOG |

| FAULT TYPE | LOG NO. |
|---|---|
| COPY FAULT | 1000, 2007, 2008 |
| PRINTER FAULT | 1000, 2004, 2005, 2006, 2007, 2008 |
| NETWORK FAULT | 1000, 2003, 2008 |
| OPTIONAL I/F FAULT | 1025, 2000, 2001, 4000 |

FIG.24

```
***************** <LOG START> DATE:2004.05.26  TIME:16:26:13 *****************
<<<ncsd:ncsCheckAccess(cid:21)>>>
 ncs_check_access():(0) [0]-[0], addr=[a5608b87].
 ncs_check_access():(1) [0]-[0], addr=[a5608b87].
 ncs_check_access():(2) [0]-[0], addr=[a5608b87].
 ncs_check_access():(3) [0]-[0], addr=[a5608b87].
 ncs_check_access():(4) [0]-[0], addr=[a5608b87].
ncs_check_access(): OK
<<<ncsd:ncs_regist_daemon>>>
            DaemonID:[3] ClientID:[22] SignalReq:[1] pid:[54]
            registed daemon[5403]
<<<ncsd:ncs_unregist_daemon>>>
            *Parameters*[cid:21/servid:5303]
            unregisted daemon[0x14b7]
<<<ncsd:ncs_get_aplsig(SERVID:5403)>>>
            *Parameters*[cid:22/server_id:5403]
<<<ncsd_local:_ncs_reg_setaplinf_signal() Called. [serv_id:5403 sig:1]
@ send APLINF(aplid:6/flg:0x787fd)
<<<ncsd:ncs_setsysparam>>>
<<<ncsd:ncsCheckAccess(cid:22)>>>
 ncs_check_access():(0) [0]-[0], addr=[a5608b87].
 ncs_check_access():(1) [0]-[0], addr=[a5608b87].
 ncs_check_access():(2) [0]-[0], addr=[a5608b87].
 ncs_check_access():(3) [0]-[0], addr=[a5608b87].
 ncs_check_access():(4) [0]-[0], addr=[a5608b87].
ncs_check_access(): OK
<<<ncsd:ncs_regist_daemon>>>
            DaemonID:[3] ClientID:[21] SignalReq:[1] pid:[55]
            registed daemon[5503]
<<<ncsd:ncs_get_aplsig(SERVID:5503)>>>
            *Parameters*[cid:21/server_id:5503]
<<<ncsd_local:_ncs_reg_setaplinf_signal() Called. [serv_id:5503 sig:1]
@ send APLINF(aplid:6/flg:0x787fd)
<<<ncsd:ncs_setsysparam>>>
<<<ncsd:ncsCheckAccess(cid:21)>>>
 ncs_check_access():(0) [0]-[0], addr=[a5608b87].
 ncs_check_access():(1) [0]-[0], addr=[a5608b87].
 ncs_check_access():(2) [0]-[0], addr=[a5608b87].
 ncs_check_access():(3) [0]-[0], addr=[a5608b87].
 ncs_check_access():(4) [0]-[0], addr=[a5608b87].
ncs_check_access(): OK
***************** <LOG END>   DATE:2004.05.26  TIME:16:26:24 *****************
```

FIG.25

```
***************** <LOG START> DATE:2004.05.26  TIME:16:26:13 *****************
<<<ncsd:ncsCheckAccess(cid:21)>>>
 ncs_check_access():(0) [0]-[0], addr=[a5608b87].
 ncs_check_access():(1) [0]-[0], addr=[a5608b87].
 ncs_check_access():(2) [0]-[0], addr=[a5608b87].
 ncs_check_access():(3) [0]-[0], addr=[a5608b87].
 ncs_check_access():(4) [0]-[0], addr=[a5608b87].
ncs_check_access() : OK
<<<ncsd_local:_ncs_reg_setaplinf_signal() Called. [serv_id:5403 sig:1]
@ send APLINF(aplid:6/flg:0x787fd)
<<<ncsd:ncs_setsysparam>>>
<<<ncsd:ncsCheckAccess(cid:22)>>>
 ncs_check_access():(0) [0]-[0], addr=[a5608b87].
 ncs_check_access():(1) [0]-[0], addr=[a5608b87].
 ncs_check_access():(2) [0]-[0], addr=[a5608b87].
 ncs_check_access():(3) [0]-[0], addr=[a5608b87].
 ncs_check_access():(4) [0]-[0], addr=[a5608b87].
ncs_check_access() : OK
<<<ncsd_local:_ncs_reg_setaplinf_signal() Called. [serv_id:5503 sig:1]
@ send APLINF(aplid:6/flg:0x787fd)
<<<ncsd:ncs_setsysparam>>>
<<<ncsd:ncsCheckAccess(cid:21)>>>
 ncs_check_access():(0) [0]-[0], addr=[a5608b87].
 ncs_check_access():(1) [0]-[0], addr=[a5608b87].
 ncs_check_access():(2) [0]-[0], addr=[a5608b87].
 ncs_check_access():(3) [0]-[0], addr=[a5608b87].
 ncs_check_access():(4) [0]-[0], addr=[a5608b87].
ncs_check_access() : OK
***************** <LOG END>   DATE:2004.05.26  TIME:16:26:24 *****************
```

FIG.26

```
***************** <LOG START> DATE:2004.05.26  TIME:16:26:13 *****************
ncs_check_access() : OK
@ send APLINF(aplid:6/flg:0x787fd)
<<<ncsd:ncs_setsysparam>>>
<<<ncsd:ncsCheckAccess(cid:22)>>>
ncs_check_access() : OK
@ send APLINF(aplid:6/flg:0x787fd)
<<<ncsd:ncs_setsysparam>>>
<<<ncsd:ncsCheckAccess(cid:21)>>>
ncs_check_access() : OK
***************** <LOG END>   DATE:2004.05.26  TIME:16:26:24 *****************
```

FIG.28

```
***************** <LOG START> DATE:2004.05.26  TIME:16:26:13 *****************
<<<ncsd:ncsCheckAccess(cid:21)>>>
 ncs_check_access() : (0)  [0]-[0], addr=[a5608b87].
 ncs_check_access() : (1)  [0]-[0], addr=[a5608b87].
 ncs_check_access() : (2)  [0]-[0], addr=[a5608b87].
 ncs_check_access() : (3)  [0]-[0], addr=[a5608b87].
 ncs_check_access() : (4)  [0]-[0], addr=[a5608b87].
ncs_check_access() : OK
<<<ncsd:ncs_regist_daemon>>>
          DaemonID:[3] ClientID:[22] SignalReq:[1] pid:[54]
          registed daemon[5403]
<<<ncsd:ncs_unregist_daemon>>>
          *Parameters*[cid:21/servid:5303]
          unregisted daemon[0x14b7]
<<<ncsd:ncs_get_aplsig(SERVID:5403)>>>
          *Parameters*[cid:22/server_id:5403]
<<<ncsd_local:_ncs_reg_setaplinf_signal() Called. [serv_id:5403 sig:1]
@ send APLINF(aplid:6/flg:0x787fd)
<<<ncsd:ncs_setsysparam>>>
<<<ncsd:ncsCheckAccess(cid:22)>>>
 ncs_check_access() : (0)  [0]-[0], addr=[a5608b87].
 ncs_check_access() : (1)  [0]-[0], addr=[a5608b87].
 ncs_check_access() : (2)  [0]-[0], addr=[a5608b87].
 ncs_check_access() : (3)  [0]-[0], addr=[a5608b87].
 ncs_check_access() : (4)  [0]-[0], addr=[a5608b87].
ncs_check_access() : OK              ~1001
<<<ncsd:ncs_regist_daemon>>>
          DaemonID:[3] ClientID:[21] SignalReq:[1] pid:[55]
          registed daemon[5503]
<<<ncsd:ncs_get_aplsig(SERVID:5503)>>>
          *Parameters*[cid:21/server_id:5503]
<<<ncsd_local:_ncs_reg_setaplinf_signal() Called. [serv_id:5503 sig:1]
@ send APLINF(aplid:6/flg:0x787fd)
<<<ncsd:ncs_setsysparam>>>
<<<ncsd:ncsCheckAccess(cid:21)>>>
 ncs_check_access() : (0)  [0]-[0], addr=[a5608b87].
 ncs_check_access() : (1)  [0]-[0], addr=[a5608b87].
 ncs_check_access() : (2)  [0]-[0], addr=[a5608b87].  ~1002
 ncs_check_access() : (3)  [0]-[0], addr=[a5608b87].
 ncs_check_access() : (4)  [0]-[0], addr=[a5608b87].
ncs_check_access() : OK
***************** <LOG END>  DATE:2004.05.26  TIME:16:26:24 *****************
```

FIG.30A  C:¥>rsh host-a getlog 256

FIG.30B
Power ON
Memory address [12345678] Size [256 MB]
With hard disk
Hard disk capacity 40 MB
System area 128 MB
Work area 128 MB
System check complete

FIG.33

```
************* <LOG START>  DATE:2004.05.26  TIME:16:26:13 *************
Power ON
Memory address [12345678] Size [256 MB]
With hard disk
Hard disk capacity 40 MB
System area 128 MB
Work area 128 MB
System check complete
************* <LOG END>    DATE:2004.05.26  TIME:16:26:24 *************
```

161 — (first line)
162 — (Power ON ... System check complete)
163 — (last line)

LOG COLLECTING APPARATUS, IMAGE FORMING APPARATUS AND COMPUTER-READABLE STORAGE MEDIUM

BACKGROUND OF THE INVENTION

1. Field of the Invention

The present invention generally relates to log collecting apparatuses, image forming apparatuses and computer-readable storage media, and more particularly to a log collecting apparatus for collecting logs from programs that run inside an image forming apparatus or the like, an image forming apparatus that uses such a log collecting apparatus, and a computer-readable storage medium that stores a log collecting program for causing a computer to collect logs.

2. Description of the Related Art

In image forming apparatuses that are often referred to as composite apparatuses or multi-function peripherals (or multi-function apparatuses) and have the functions or facilities of a copying apparatus, a printer, a scanner and the like, a plurality of DAEMONs (server programs) that provide various kinds of services on an Operating System (OS) such as the UNIX (registered trademark) operate in a manner linked to each other.

In addition, in order to facilitate a cause of a fault to be specified when the fault is generated, each DAEMON is provided with a function of outputting a log that records its operating state. The log may be acquired by inputting a log acquisition command to the image forming apparatus from a personal computer or the like via a network.

FIG. 1 is a diagram showing an example of an operation when collecting a log in a conventional image forming apparatus. By inputting a request 71 such as "rsh 11.22.33.44 getlog 1000" from a keyboard of the personal computer or the like, a response 72 of the log indicating the operating state is acquired. In the request 71, "rsh" indicates a command for executing a command on a remote host (image forming apparatus), "11.22.33.44" indicates an Internet Protocol (IP) address of the image forming apparatus, "getlog" indicates the log acquisition command, and "1000" indicates a log number corresponding to the DAEMON that outputs the log.

Similarly, when acquiring the logs from other DAEMONs, requests 73 through 76 with log numbers changed are repeated, so as to acquire the responses of the corresponding logs.

As described above, the log is conventionally acquired by inputting the log acquisition command to the image forming apparatus from the keyboard of the personal computer or the like via the network, which resulted in the following problems.

First, there was a problem in that a troublesome operation is required because of the need to input the log acquisition command from the keyboard of the personal computer or the like. Particularly in the existing image forming apparatus in which the plurality of DAEMONs operate in a manner linked to each other as described above, a plurality of logs must be acquired in order to locate the cause of the fault, and similar requests must be repeated a plurality of times, thereby placing a large burden on the operator (or user). In addition, in a case where the acquired logs are stored, a separate operation was required to store the acquired logs.

Second, there was a problem in that the plurality of logs that are related and used to locate the cause of the fault cannot be selected appropriately. In other words, when acquiring the log of a certain DAEMON, there are many cases where the cause of the fault cannot be specified effectively unless the logs of the other DAEMONs that operate in the manner linked to the certain DAEMON are also acquired. A program developer who develops the programs would know the mutual relationship of the DAEMONs, and the program developer would likely be able to select the appropriate the logs that are related and used to locate the cause of the fault. But the person who locates the cause of this type of fault is usually a service person who attends to the image forming apparatus at the site where the image forming apparatus is set up, and the service person cannot select the appropriate logs that are related and used to locate the cause of the fault.

Third, the log number is unified in the case of the image forming apparatuses manufactured by the same manufacturer, but the log numbers that are supported differ depending on the model of the image forming apparatus. Hence, when the log acquisition command is input to the image forming apparatus, the log may not be acquired if the selected log number is not supported. If the operator recognizes that the selected log number is not supported, the situation may be remedied although the operation that are made and the time are slightly wasted. However, if the operator erroneously recognizes the situation as another fault where the log becomes non-acquirable, this erroneous recognition will have adverse effects when thereafter specifying the cause of the fault.

Fourth, even in a case where the logs to be acquired are known from experience depending on the type of fault, the service person (or operator) who attends to the image forming apparatus at the site where the image forming apparatus is set up may not have such knowledge, and without such knowledge, there was a problem in that the service person cannot select the appropriate logs.

Fifth, when specifying the cause of the fault, the detail (fineness or roughness) of the desired logs differs depending on the situation, but conventionally, it is only possible to acquire the logs of the same detail level (or the same layer of the hierarchical structure) for the same log number. As a result, there was a problem in that it is troublesome to obtain the desired information from the logs of the same detail level.

SUMMARY OF THE INVENTION

Accordingly, it is a general object of the present invention to provide a novel and useful log collecting apparatus, image forming apparatus and computer-readable storage medium, in which the problems described above are suppressed.

Another and more specific object of the present invention is to provide a log collecting apparatus, an image forming apparatus and a computer-readable storage medium, which can improve the operation ease, and enable collection of logs that are effective in specifying a cause of a fault.

Still another and more specific object of the present invention is to provide a log collecting apparatus comprising a graphical user interface configured to urge an operator to select a target equipment that is a target of a log collection and logs that are to be collected; and a combination managing part configured to identify related logs that are other than the logs selected on the user graphical interface and are related to the logs selected on the graphical user interface, and to make the related logs selectable on the graphical user interface. According to the log collecting apparatus of the present invention, it is possible to improve the operation ease of the graphical user interface, and to automatically select the related logs, the supported logs supported by the equipment and the logs depending on the fault type, so that the logs effective to specify the cause of the fault can be collected.

A further object of the present invention is to provide a computer-readable storage medium which stores a program for causing a computer to function as a graphical user interface configured to urge an operator to select a target equipment that is a target of a log collection and logs that are to be collected; and a combination managing part configured to identify related logs that are other than the logs selected on the user graphical interface and are related to the logs selected on the graphical user interface, and to make the related logs selectable on the graphical user interface. According to the computer-readable storage medium of the present invention, it is possible to improve the operation ease of the graphical user interface, and to automatically select the related logs, the supported logs supported by the equipment and the logs depending on the fault type, so that the logs effective to specify the cause of the fault can be collected.

Another object of the present invention is to provide an image forming apparatus comprising a process part configured to carry out a process related to an image formation; and a notifying part configured to identify supported logs supported by the image forming apparatus when a request requesting the logs supported by the image forming apparatus is received from a log collecting apparatus via a network, and to notify the identified supported logs to the log collecting apparatus. According to the image forming apparatus of the present invention, it is possible to improve the operation ease of the graphical user interface, and to automatically select the related logs, the supported logs supported by the equipment and the logs depending on the fault type, so that the logs effective to specify the cause of the fault can be collected.

Still another object of the present invention is to provide an image forming apparatus comprising a process part configured to carry out a process related to an image formation; and a notifying part configured to identify supported logs supported by the image forming apparatus and related logs other than the supported logs and related to each of the supported logs, when a request requesting the logs supported by the image forming apparatus is received from a log collecting apparatus via a network, and to notify the identified supported logs and related logs to the log collecting apparatus. According to the image forming apparatus of the present invention, it is possible to improve the operation ease of the graphical user interface, and to automatically select the related logs, the supported logs supported by the equipment and the logs depending on the fault type, so that the logs effective to specify the cause of the fault can be collected.

Other objects and further features of the present invention will be apparent from the following detailed description when read in conjunction with the accompanying drawings.

BRIEF DESCRIPTION OF THE DRAWINGS

FIG. 1 is a diagram showing an example of an operation when collecting a log in a conventional image forming apparatus;

FIG. 3 is a diagram showing an embodiment of a related log number management table;

FIG. 4 is a diagram showing meanings of main log numbers;

FIG. 24 is a diagram showing a log that is output when the log collecting detail level is "high";

FIG. 25 is a diagram showing a log that is output when the log collecting detail level is "medium";

FIG. 26 is a diagram showing a log that is output when the log collecting detail level is "low";

FIG. 28 is a diagram showing logs that are output when the log collecting detail level is "automatic";

FIGS. 30A and 30B are diagrams showing a log collecting request and a response;

FIG. 33 is a diagram showing a log file.

DESCRIPTION OF THE PREFERRED EMBODIMENTS

A description will be given of embodiments of a log collecting apparatus, an image forming apparatus and a computer-readable storage medium according to the present invention, by referring to FIG. 2 and the subsequent drawings. For the sake of convenience, a description will be given of a case where the log collecting apparatus according to the present invention and a log collecting program that is stored in the computer-readable storage medium according to the present invention are formed as a log collecting tool that functions in a personal computer. However, the log collecting tool, that is, the log collecting apparatus and the log collecting program, may of course be provided in a target equipment (for example, the image forming apparatus) that is the target from which the logs are to be acquired or collected.

Figure 2:
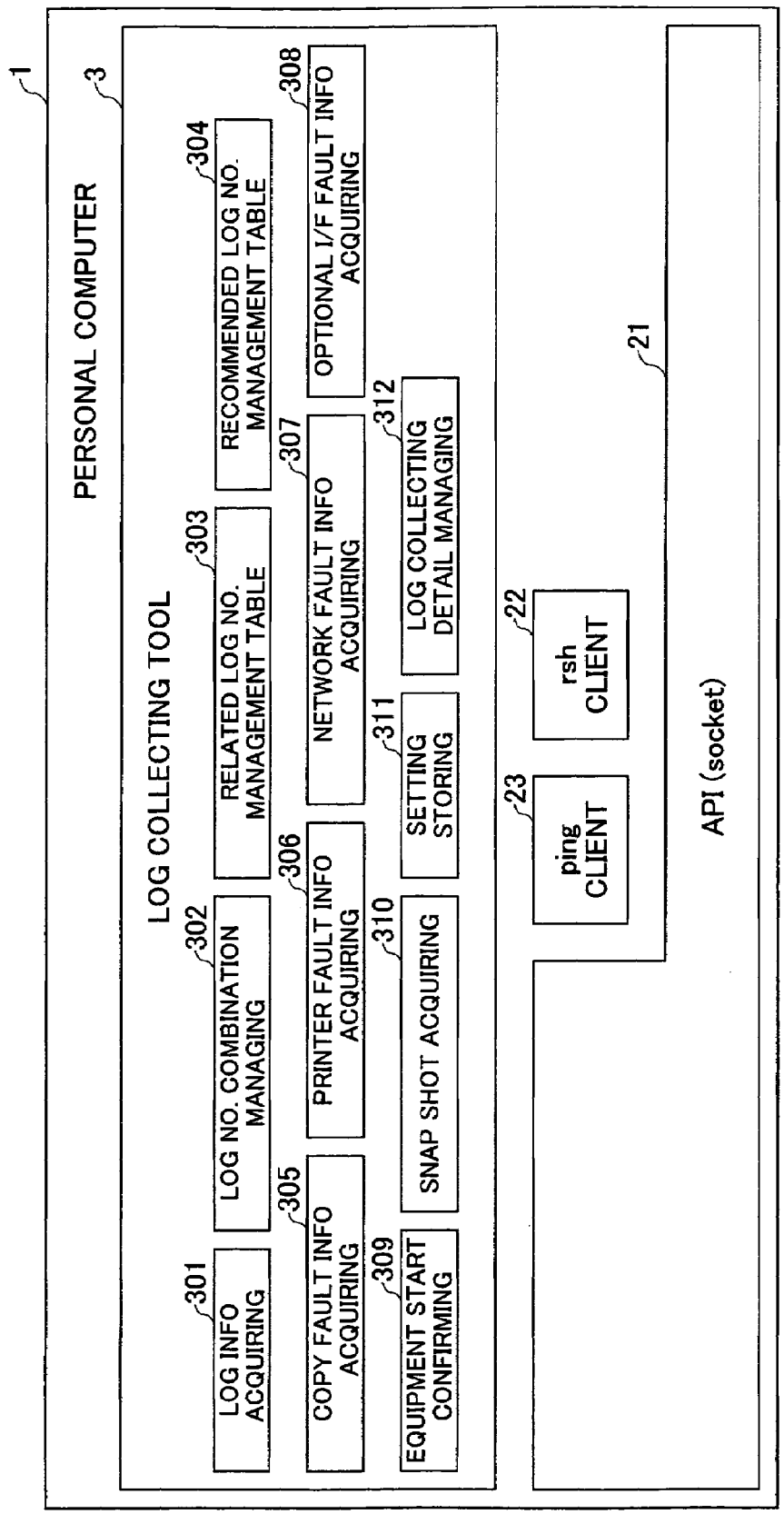
FIG. 2 is a diagram showing a structure of a log collecting tool in an embodiment of the present invention.

FIG. 2 is a diagram showing a structure of a log collecting tool in an embodiment of the present invention.

In FIG. 2, a log collecting tool 3 is designed to operate by using an Application Program Interface (API) 21, a ping client 23, an rsh client 22 and the like, and is provided as a software (program) that is usable when installed to a personal computer 1. The API 21 is for utilizing the functions or facilities provided by the Operating System (OS) of the personal computer 1. The ping client 23 is for performing a connection test and the like by sending an echo request to a host (image forming apparatus) in a network. The rsh client 22 is for executing commands on the host in the network.

The log collecting tool 3 includes a log information acquiring part 301 for performing a general process from acquisition of log information using the rsh client 22 to storage of the log information as a log file, a log number combination managing part 302 for managing selection of log numbers (log identifiers) that are required to acquire the log information, a related log number management table 303 that is used when selecting the log number in the log number combination managing part 302, and a recommended log number management table 304.

The log collecting tool 3 also includes a copy fault information acquiring part 305 for acquiring the log information according to the type of fault, a printer fault information acquiring part 306, a network fault information acquiring part 307, and an option interface (I/F) fault information acquiring part 308.

Moreover, the log collecting tool 3 further includes an equipment start confirming part 309 for making a start confirmation of an equipment (image forming apparatus) in the network by use of the ping client 23 or the like, a snap shot acquiring part 310 for acquiring log information presently held (stored) by the image forming apparatus, and a setting holding part 311 for storing various settings.

The log collecting tool 3 also includes a log collecting detail managing part 312 for managing the detail (fineness or roughness) of the description level of the logs when collecting the log information.

FIG. 3 is a diagram showing an embodiment of the related log number management table 303 shown in FIG. 2. With respect to a selected log number, related log numbers that are related thereto from the point of view of effectively specifying a cause of a fault, are stored correspondingly in the related log number management table 303. For example, the log numbers "2001, 2002" are stored correspondingly with respect to the log number "1000", the log numbers "1025, 2001" are stored correspondingly with respect to the log number "2000", the log numbers "1000, 1025, 2000" are stored correspondingly with respect to the log number "2001", and the log number "2008" is stored correspondingly with respect to the log number "2002".

FIG. 4 is a diagram showing meanings of main log numbers. For example, the log number "1000" indicates a network related (basic) log, the log number "1025" indicates an optional paper supply tray related log, the log number "2000" indicates an optional paper eject tray related log, the log number "2001" indicates a duplex unit related log, the log number "2003" indicates a network related (TCP/IP) log, the log number "2004" indicates a spool related log, the log number "2005" indicates a PS related log, the log number "2006" indicates a TIFF related log, the log number "2007" indicates a JPEG related log, the log number "2008" indicates a print related log, and the log number "4000" indicates an ADF related log.

Figure 5:
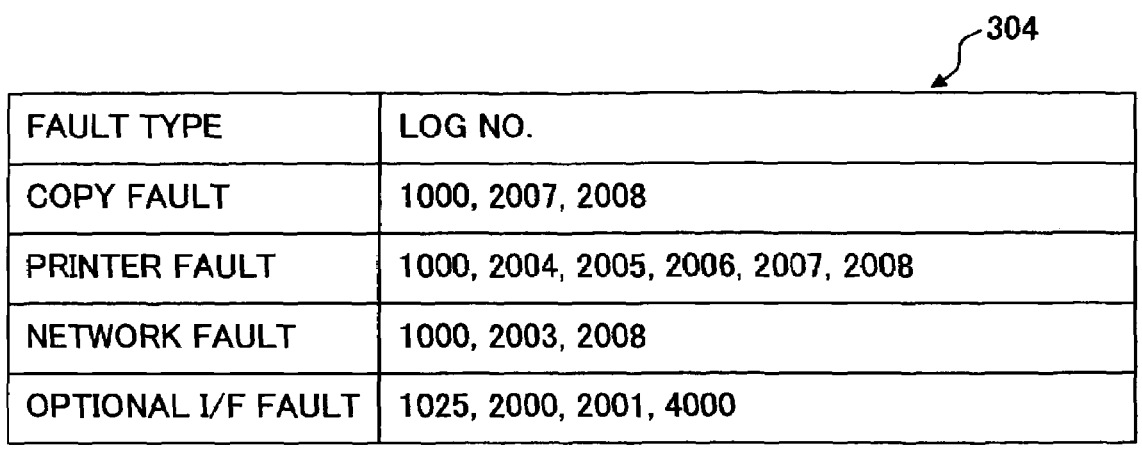
FIG. 5 is a diagram showing an embodiment of a recommended log number management table.

FIG. 5 is a diagram showing an embodiment of the recommended log number management table 304 shown in FIG. 2. Depending on the type of fault, a group of recommended log numbers are stored correspondingly in the recommended log number management table 304. For example, the log numbers "1000, 2007, 2008" are stored correspondingly with respect to a copy fault, the log numbers "1000, 2004, 2005, 2006, 2007, 2008" are stored correspondingly with respect to a printer fault, the log numbers "1000, 2003, 2008" are stored correspondingly with respect to a network fault, and the log numbers "1025, 2000, 2001, 4000" are stored correspondingly with respect to an optional interface (I/F) fault.

Figure 6:
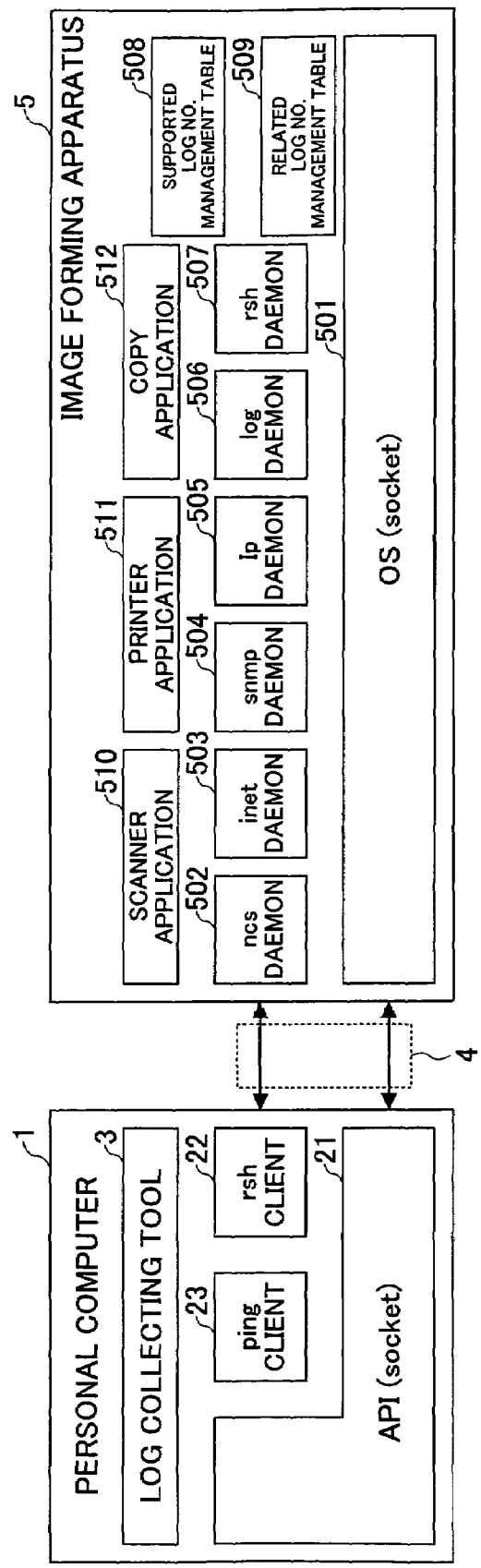
FIG. 6 is a diagram showing a structure of an image forming apparatus.

FIG. 6 is a diagram showing a structure of the image forming apparatus which is a target of the log collection.

In FIG. 6, an image forming apparatus 5 is connected to the personal computer 1 that is provided with the log collecting tool 3, via a network 4. An internal structure of the image forming apparatus 5 includes DAEMONs 502 through 507 for providing various kinds of services on an OS 501 that includes communication functions or facilities (SOCKET). A scanner application 510, a printer application 511, a copy application 512 and the like operate on the DAEMONs 502 through 507.

The log DAEMON 507 manages the logs of the DAEMONs 502 through 505 and the like. The rsh DAEMON 507 processes an rsh command that is sent from the log collecting tool 3 of the personal computer 1.

The image forming apparatus 5 further includes a supported log number management table 508 for managing the log numbers supported by the image forming apparatus 5, and a related log number management table 509 for managing the log numbers supported by the image forming apparatus 5 and the log numbers related thereto (the related log numbers that are related from the point of view of effectively specifying the cause of the fault) in a corresponding manner.

It is not essential to always provide both the support log management table 508 and the related log number management table 509, and the supported log number management table 508 may be omitted when the related log number management table 509 is provided. By providing the supported log number management table 508 and the related log number management table 509 in the image forming apparatus 5, it becomes easy to transfer most recent information when a new model is released.

The supported log number management table 508 and the related log number management table 509 may be provided in an external apparatus that is connected to the image forming apparatus 5 via a network.

Figure 7:
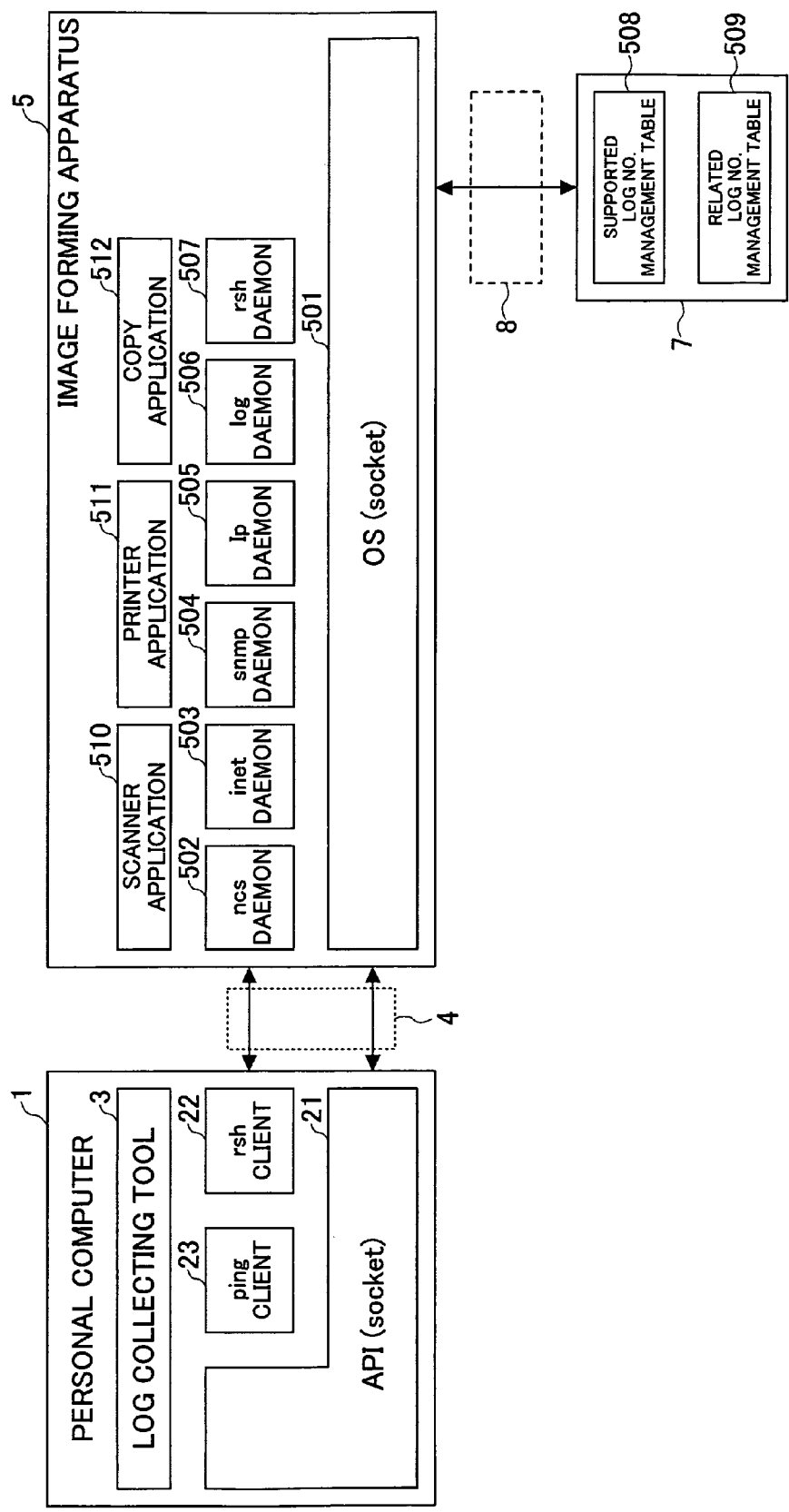
FIG. 7 is a diagram showing another structure of the image forming apparatus.

FIG. 7 is a diagram showing another structure of the image forming apparatus that is the target of the log collection. In FIG. 7, the supported log number management table 508 and the related log number management table 509 are not provided in the image forming apparatus 5, but are provided in an external apparatus 7 that is connected to the image forming apparatus 5 via a network 8. Hence, the image forming apparatus 5 uses the supported log number management table 508 and the related log number management table 509 within the external apparatus 7. The structure of the image forming apparatus 5 other than the supported log number management table 508 and the related log number management table 509 is the same as that shown in FIG. 6, and a description thereof will be omitted.

Figure 8:
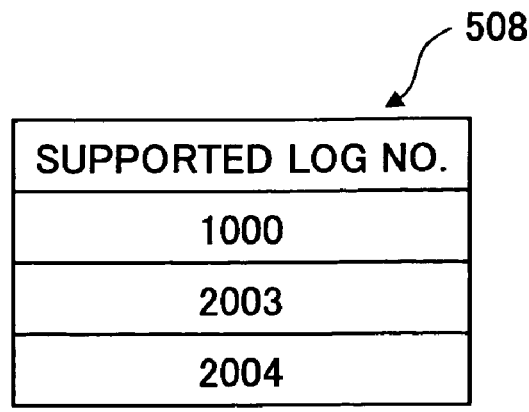
FIG. 8 is a diagram showing an embodiment of a supported log number management table.

FIG. 8 is a diagram showing an embodiment of the supported log number management table 508 shown in FIG. 6. For example, the log numbers "1000, 2003, 2004" are registered as the support numbers as shown in FIG. 8.

Figure 9:
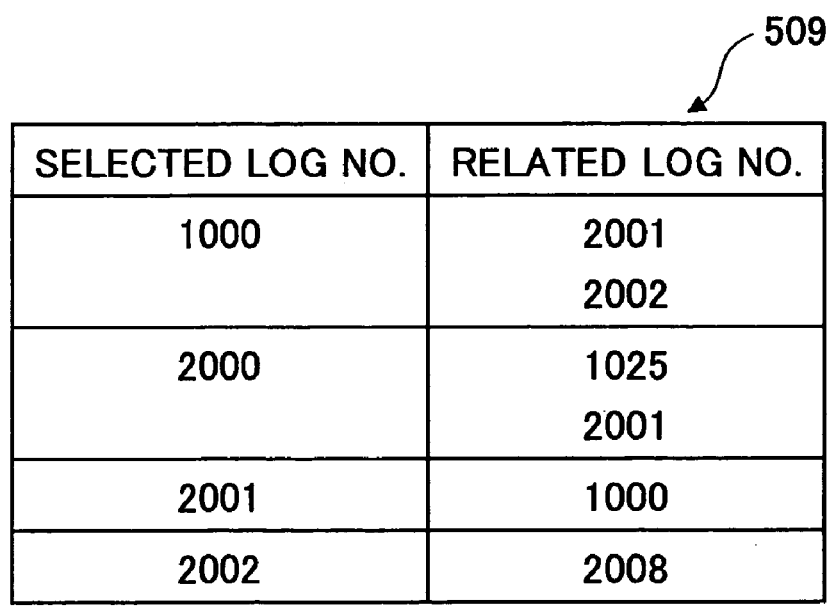
FIG. 9 is a diagram showing an embodiment of a related log number management table.

FIG. 9 is a diagram showing an embodiment of the related log number management table 509 shown in FIG. 6. With respect to the selected log numbers, the related log numbers that are related from the point of view of effectively specifying the cause of the fault are stored correspondingly. For example, the related log numbers "2001, 2002" are stored with respect to the selected log number "1000", the related log numbers "1025, 2001" are stored with respect to the selected log number "2000", the related log number "1000" is stored with respect to the selected log number "2001", and the related log number "2008" is stored with respect to the selected log number "2002", as shown in FIG. 9.

Figure 10:
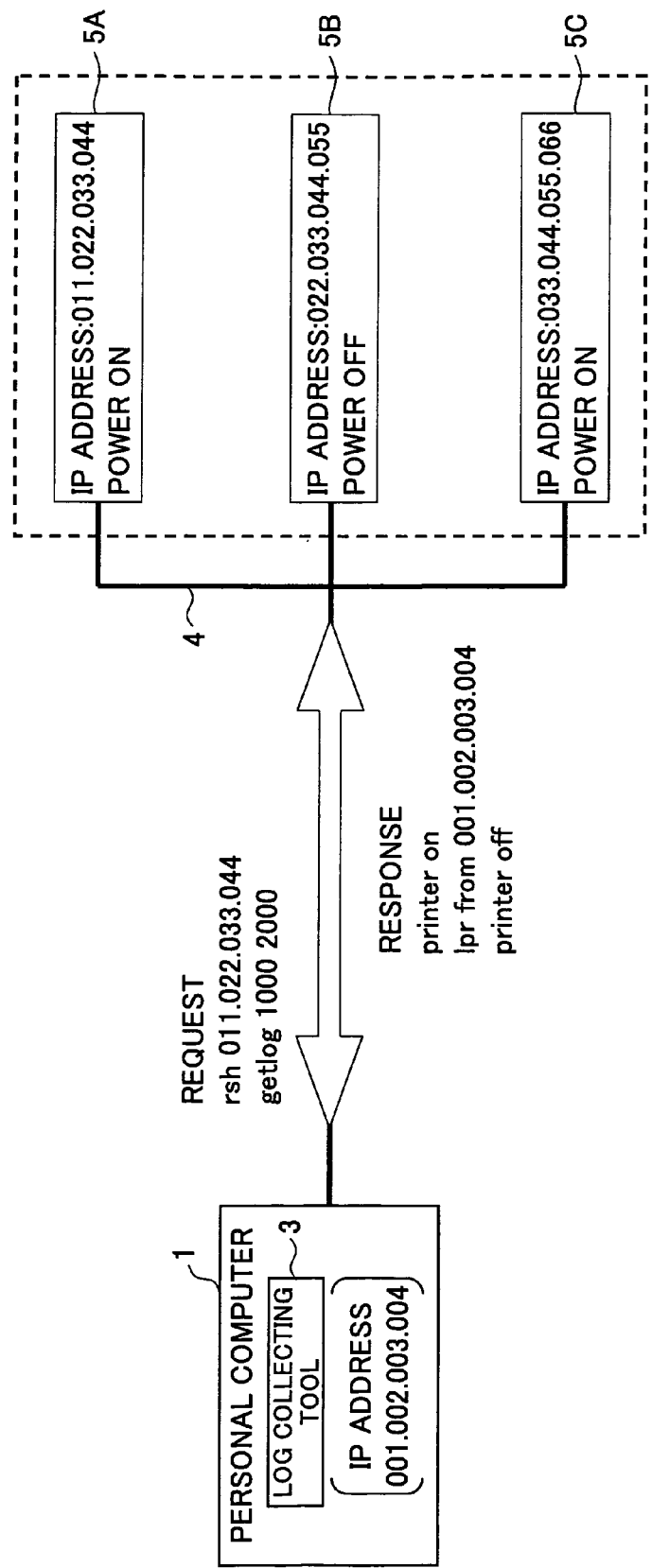
FIG. 10 is a diagram for explaining a general operation of a log collection by a log collecting tool.

FIG. 10 is a diagram for explaining a general operation of the log collection by the log collecting tool 3.

In FIG. 10, it is assumed that image forming apparatuses 5A, 5B and 5C respectively having the IP addresses. "011.022.033.044", "022.033.044.055" and "033.044.055.066" are provided in the network 4, and that the log numbers "1000, 2000" of the image forming apparatus 5A are acquired from the log collecting tool 3 of the personal computer 1. In this case, a request "rsh 011.022.033.044 getlog 1000 2000" is sent from the personal computer 1 to the image forming apparatus 5A. The image forming apparatus 5A which receives this requests returns responses such as "printer on", "lpr from 001.002.003.004" and "printer off" that are generated thereafter.

Next, a description will be given of an operation of automatically selecting the log number, which forms an important part of the present invention.

Figure 11:
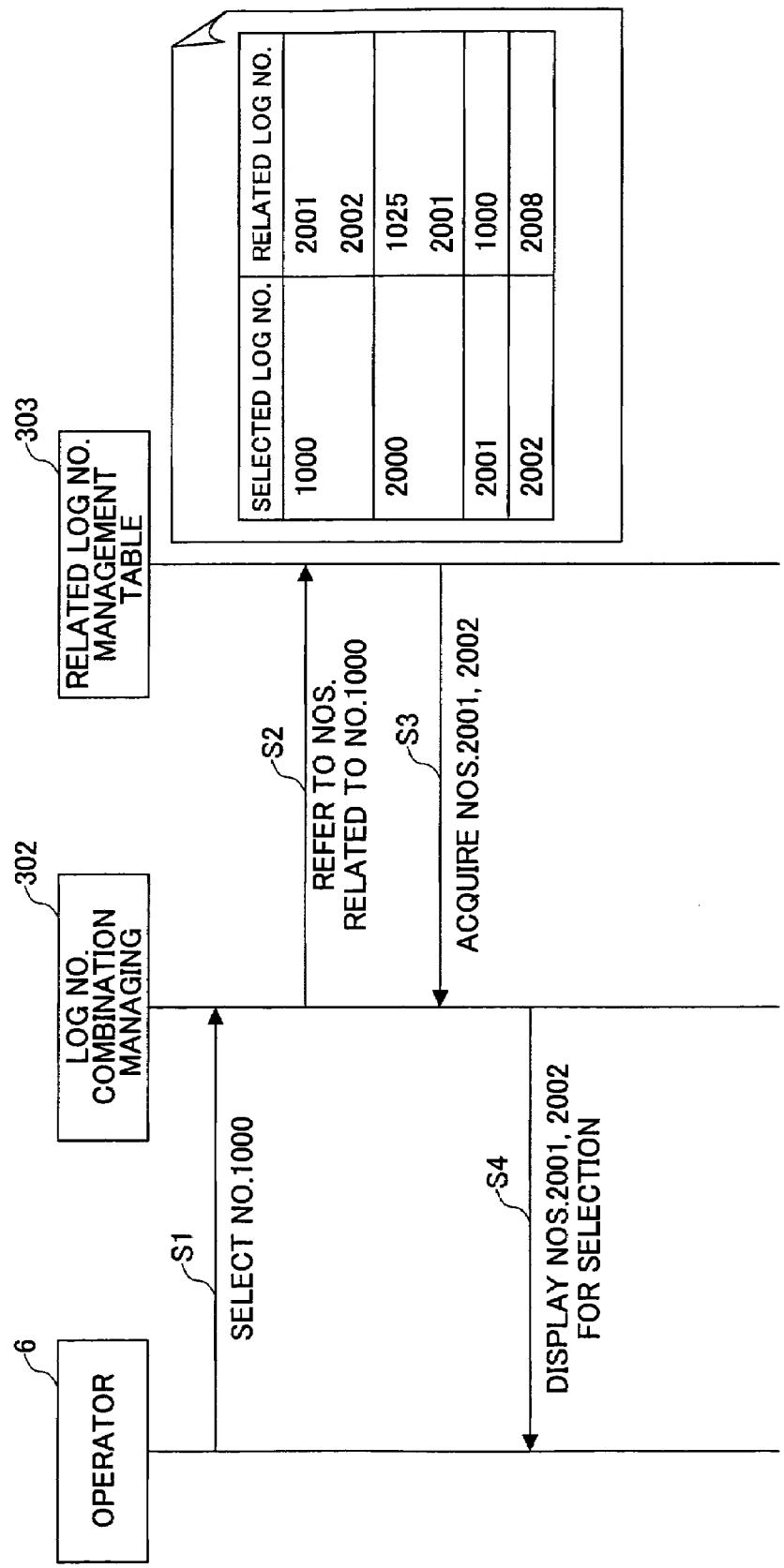
FIG. 11 is a sequence diagram showing a process of automatically selecting related log numbers.

FIG. 11 is a sequence diagram showing a process of automatically selecting the related log numbers.

In FIG. 11, when an operator 6 selects the log number "1000", for example (step S1), the log number combination managing part 302 of the log collecting tool 3 makes a reference to the related log number management table 303 (step S2), and acquires the related log numbers "2001, 2002" corresponding to the log number "1000" (step S3). Then, the log number combination managing part 302 displays the acquired related log numbers "2001, 2002" to the operator 6 (step S4), and entrusts the judgement of the operator 6 on whether the related log numbers "2001, 2002" are to be used as they are or are to be modified.

Figure 12:
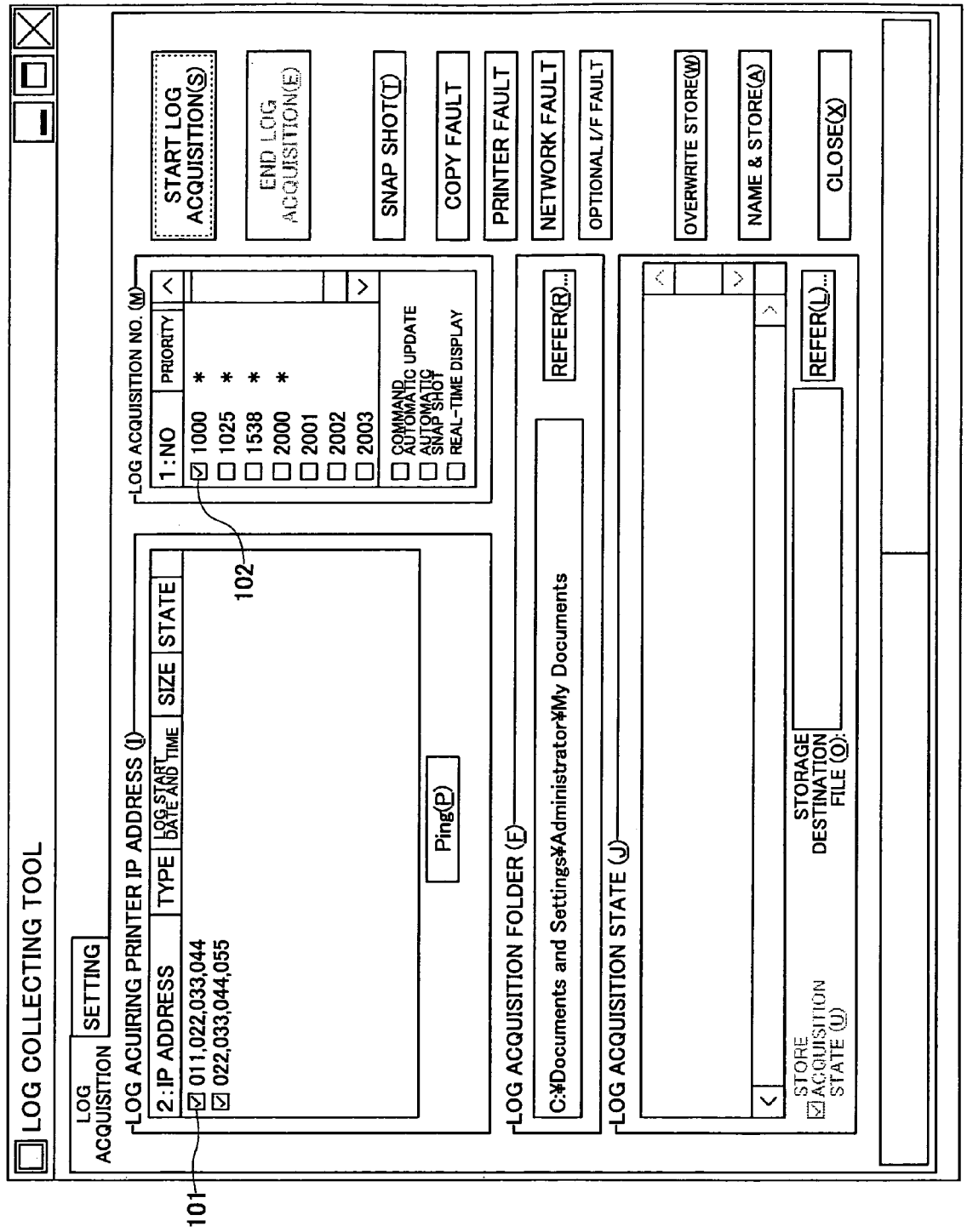
FIG. 12 is a diagram showing a screen when automatically selecting the related log numbers.
Figure 13:
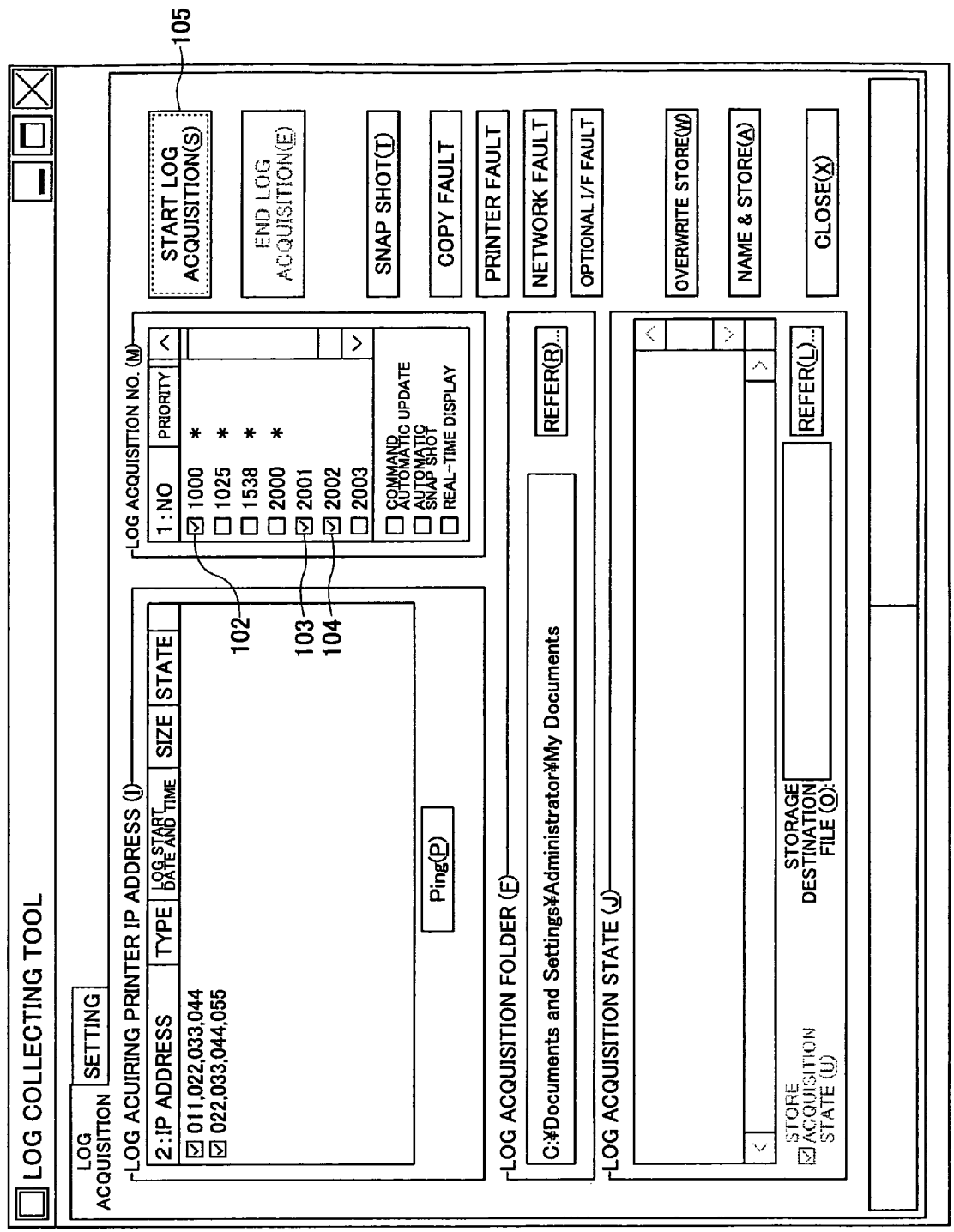
FIG. 13 is a diagram showing the screen when automatically selecting the related log numbers.

FIGS. 12 and 13 are diagrams showing a screen when automatically selecting the related log numbers.

In FIG. 12, suppose that the operator selects an IP address 101 in a region (first region) for selecting the image forming apparatus (printer) from which the logs are to be acquired, and selects a log number 102 in a region (second region) for selecting the logs that are to be collected, on a tool screen of a Graphical User Interface (GUI). In this case, the related log numbers are acquired by the process described above in conjunction with FIG. 11, and log numbers 103 and 104 related to the log number 102 are automatically selected as shown in FIG. 13. After confirming the automatically selected log numbers, the operator maintains the related log numbers 103 and 104 as they are or makes appropriate modifications, and then starts the log collection by pushing a log acquisition start button 105 (third region).

Hence, when a certain log number is selected, the other log numbers that are related thereto are automatically selected. As a result, even the service person can select the appropriate logs, although the service person who attends to the image forming apparatus at the site where the image forming apparatus is set up does not have the knowledge with respect to the mutual relationship of the DAEMONs within the equipment or apparatus that is to output the logs.

In addition, the operation ease is improved, because the log collection can be made by simply selecting the necessary items on the tool screen of the GUI and pushing the button or the like that instructs the start of the process. In FIG. 12, regions for selecting "command automatic update", "automatic snap shot" and "real-time display" are provided below the region for selecting the logs that are to be selected.

The "command automatic update" enables the logs that are collected only once by one command to be continuously acquired. The "automatic snap shot" acquires the logs that are stored in a storage unit such as a memory at a certain time. The "real-time display" displays the collected logs in real-time.

Figure 14:
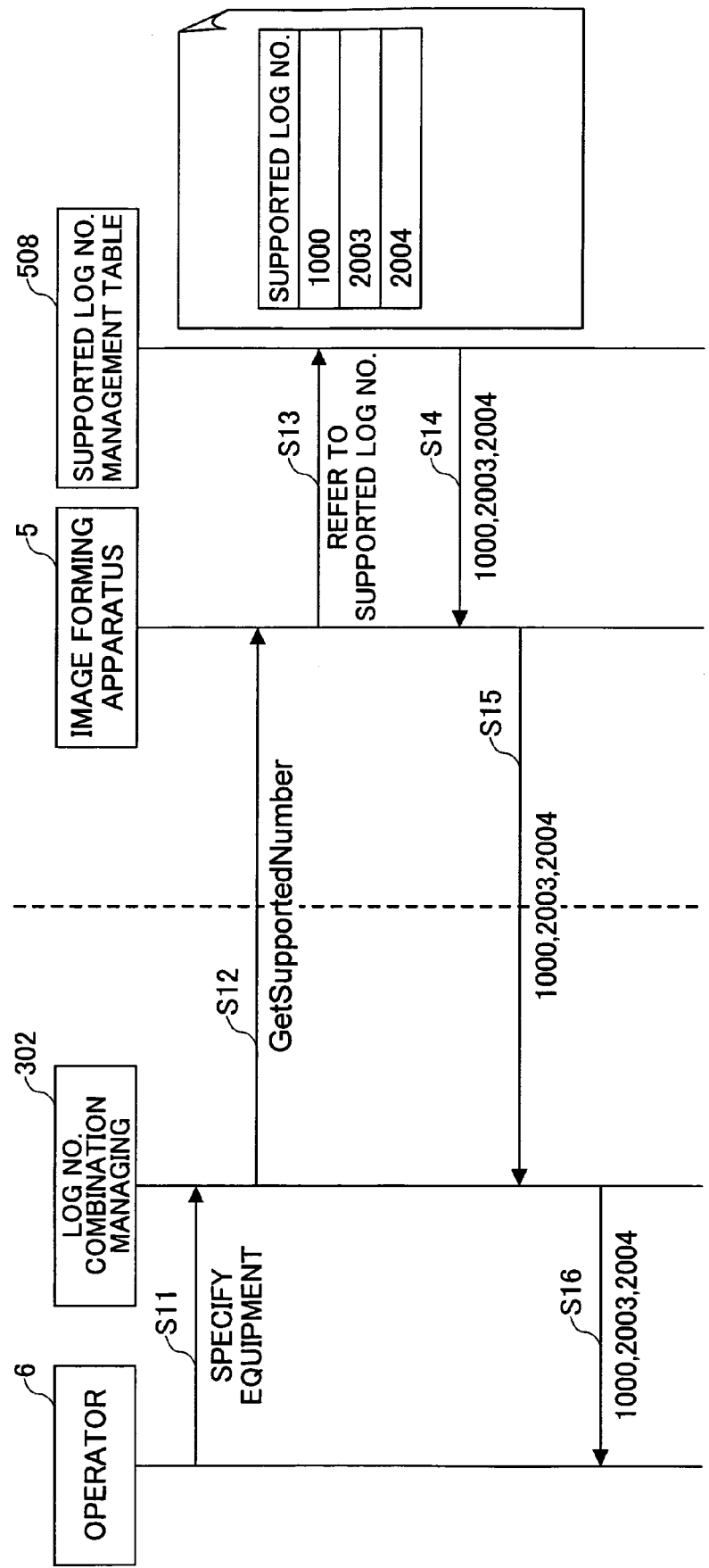
FIG. 14 is a sequence diagram showing a process of automatically acquiring log numbers supported by the image forming apparatus.

FIG. 14 is a sequence diagram showing a process of automatically acquiring the log numbers supported by the image forming apparatus, for a case where the image forming apparatus 5 is a model having a relatively small number of functions or facilities, such as a laser printer (LP).

In FIG. 14, when the operator 6 specifies the equipment (image forming apparatus) from which the logs are to be acquired (step S11), the log number combination managing part 302 of the log collecting tool 3 sends a command "GetSupportedNumber" for acquiring the supported log numbers to the image forming apparatus 5 via the network 4 (step S12).

In the image forming apparatus 5, a reference is made to the supported log number management table 508 (step S13) under the processes of the log DAEMON 506 and the rsh DAEMON 507 shown in FIG. 6, and for example, the log numbers "1000, 2003, 2004" are acquired as the supported log numbers (step S14). Then, the image forming apparatus 5 sends these supported log numbers "1000, 2003, 2004" to the log collecting tool 3 via the network 4 (step S15).

The log number combination managing part 302 of the log collecting tool 3 displays the supported log numbers "1000, 2003, 2004" to the operator 6 (step S16), and urges the operator 6 to make a selection.

Figure 15:
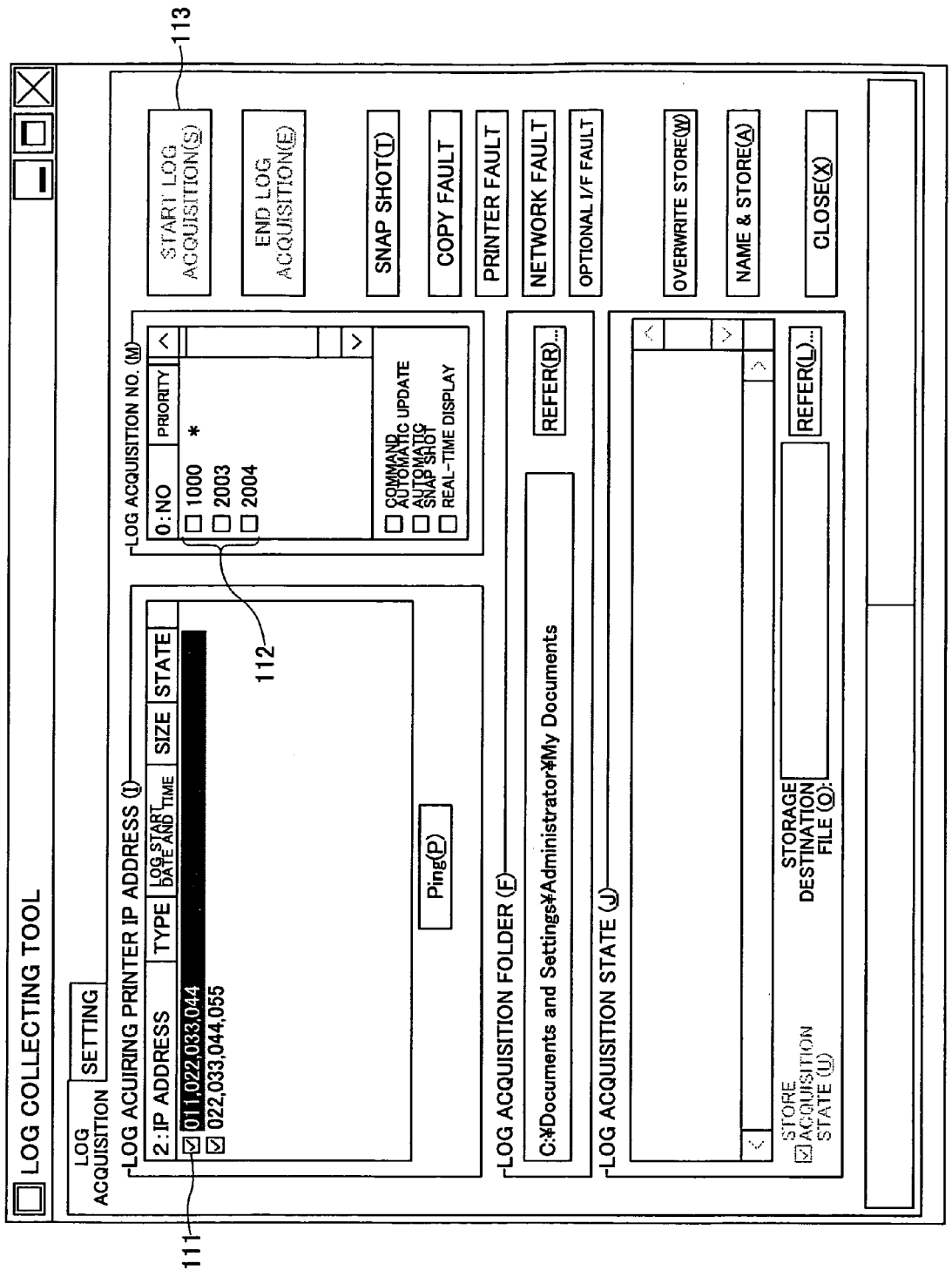
FIG. 15 is a diagram showing a screen when automatically acquiring the log numbers supported by the image forming apparatus.

FIG. 15 is a diagram showing a screen when automatically acquiring the log numbers supported by the image forming apparatus 5.

In FIG. 15, when the operator selects an IP address 111 of the image forming apparatus (printer) from which the logs are to be acquired on the tool screen of the GUI, the supported log numbers are acquired from the image forming apparatus 5 by the process described above in conjunction with FIG. 14, and the acquired supported log numbers are displayed as log numbers 112 that are selectable.

When the operator selects the desired log number from the log numbers 112 and pushes a log acquisition start button 113, the log collection is started.

Figure 16:
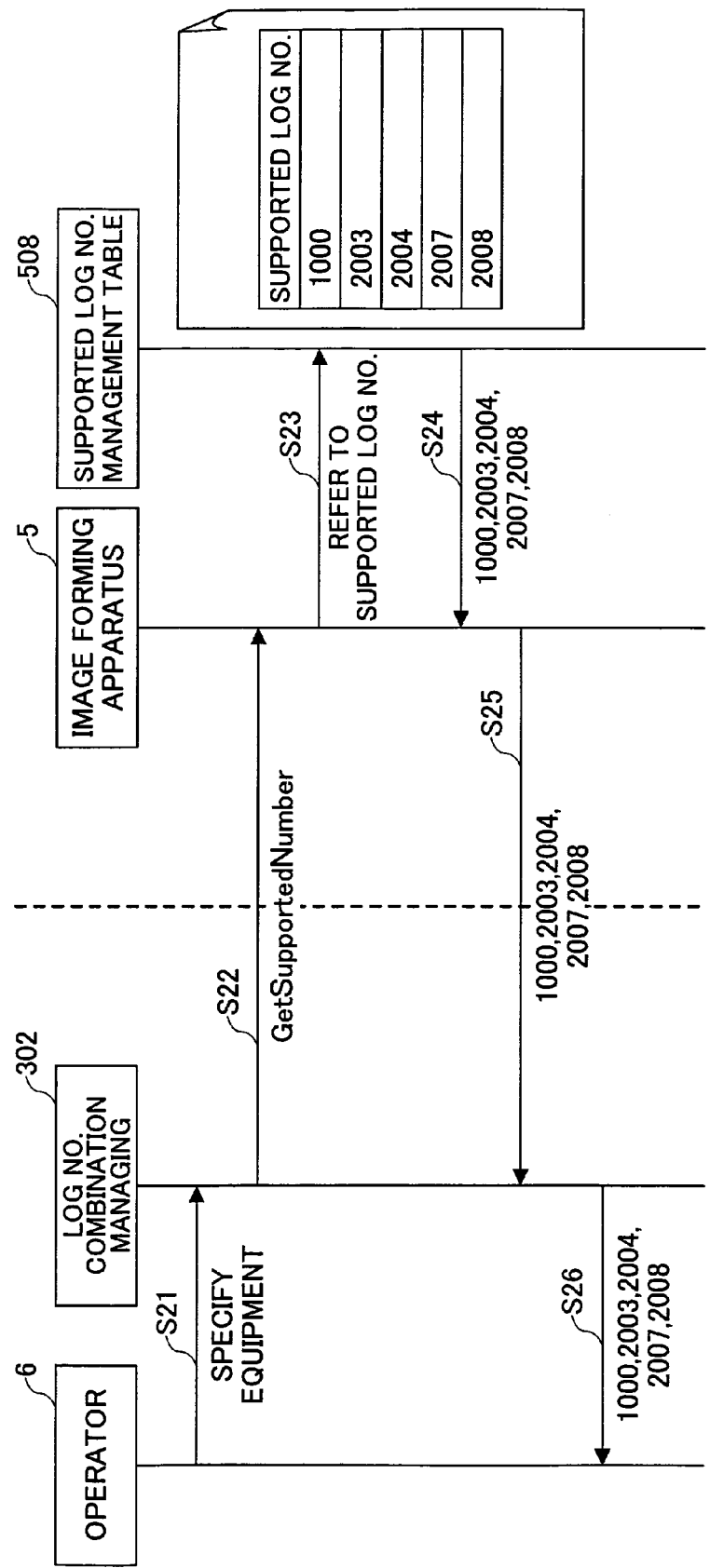
FIG. 16 is a sequence diagram showing the process of automatically acquiring the log numbers supported by the image forming apparatus.

FIG. 16 is a sequence diagram showing the process of automatically acquiring the log numbers supported by the image forming apparatus, for a case where the image forming apparatus 5 is a model having a relatively large number of functions or facilities, such as a multi-function peripheral (MFP) or a composite apparatus.

In FIG. 16, when the operator 6 specifies the equipment (image forming apparatus) from which the logs are to be acquired (step S21), the log number combination managing part 302 of the log collecting tool 3 sends a command "GetSupportedNumber" for acquiring the supported log numbers to the image forming apparatus 5 via the network 4 (step S22).

In the image forming apparatus 5, a reference is made to the supported log number management table 508 (step S23) under the processes of the log DAEMON 506 and the rsh DAEMON 507 shown in FIG. 6, and for example, the log numbers "1000, 2003, 2004, 2007, 2008" are acquired as the supported log numbers (step S24). Then, the image forming apparatus 5 sends these supported log numbers "1000, 2003, 2004, 2007, 2008" to the log collecting tool 3 via the network 4 (step S25).

The log number combination managing part 302 of the log collecting tool 3 displays the supported log numbers "1000, 2003, 2004, 2007, 2008" to the operator 6 (step S26), and urges the operator 6 to make a selection.

Figure 17:
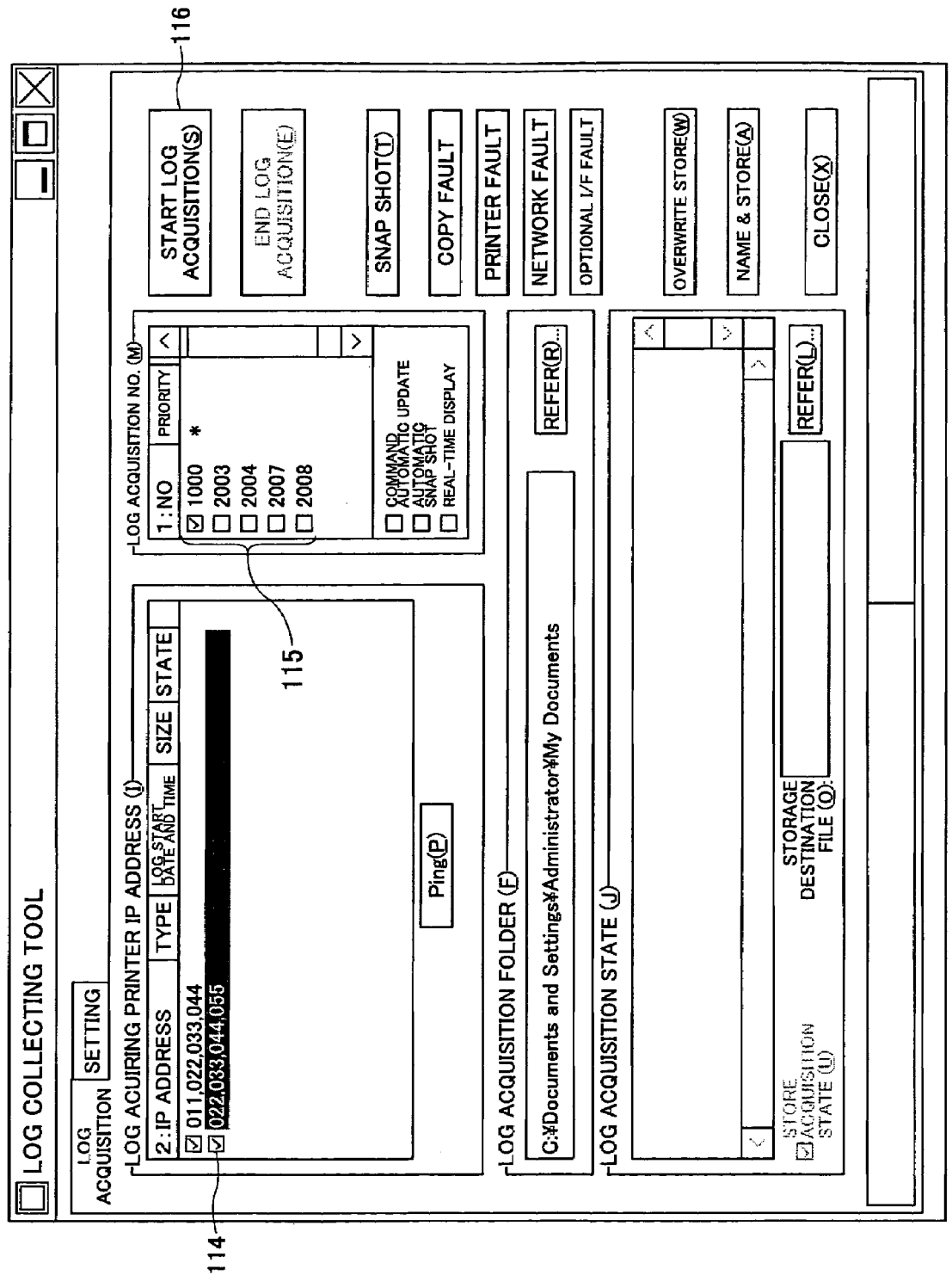
FIG. 17 is a diagram showing the screen when automatically acquiring the log numbers supported by the image forming apparatus.

FIG. 17 is a diagram showing the screen when automatically acquiring the log numbers supported by the image forming apparatus 5.

In FIG. 17, when the operator selects an IP address 114 of the image forming apparatus (printer) from which the logs are to be acquired on the tool screen of the GUI, the supported log numbers are acquired from the image forming apparatus 5 by the process described above in conjunction with FIG. 16, and the acquired supported log numbers are displayed as log numbers 115 that are selectable.

When the operator selects the desired log number from the log numbers 115 and pushes a log acquisition start button 116, the log collection is started.

Accordingly, the log numbers that are supported by the image forming apparatus are automatically acquired and made selectable by the operator. As a result, it is possible to prevent a log number that is not supported by the image forming apparatus from being input, and to prevent an erroneous recognition of a new fault where the log becomes non-acquirable.

Figure 18:
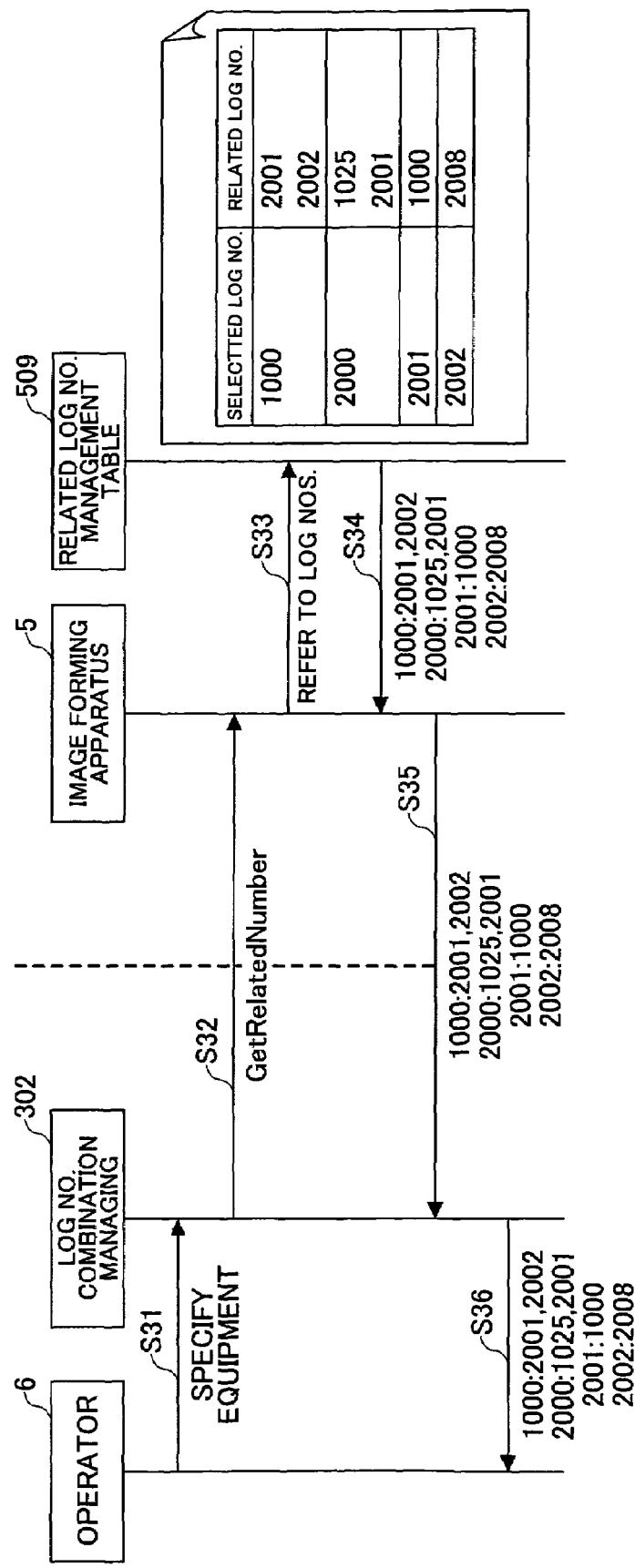
FIG. 18 is a sequence diagram showing a process of automatically acquiring the log numbers supported by the image forming apparatus and related log numbers.

FIG. 18 is a sequence diagram showing a process of automatically acquiring the log numbers supported by the image forming apparatus and the related log numbers, for a case where the log numbers supported by the image forming apparatus are acquired simultaneously as the related log numbers that are related thereto from the point of view of effectively specifying the cause of the fault.

In FIG. 18, when the operator 6 specifies the equipment (image forming apparatus) from which the logs are to be acquired (step S31), the log number combination managing part 302 of the log collecting tool 3 sends a command "GetRelatedNumber" for acquiring the supported log numbers and the related log numbers to the image forming apparatus 5 via the network 4 (step S32).

In the image forming apparatus 5, a reference is made to the related log management table 509 under the processes of the log DAEMON 506 and the rsh DAEMON 507 shown in FIG. 6 (step S33), and with respect to all of the supported log numbers, groups of the selected log numbers and the related log numbers, such as "log number groups "1000: 2001, 2002", "2000: 1025, 2001", "2001: 1000" and "2002: 2008" are acquired (step S34). Then, the image forming apparatus 5 sends these acquired groups of the selected log numbers and the related log numbers to the log collecting tool 3 via the network 4 (step S35).

The log number combination managing part 302 of the log collecting tool 3 displays the these acquired groups of the selected log numbers and the related log numbers to the operator 6 (step S36), and urges the operator 6 to make a selection.

Figure 19:
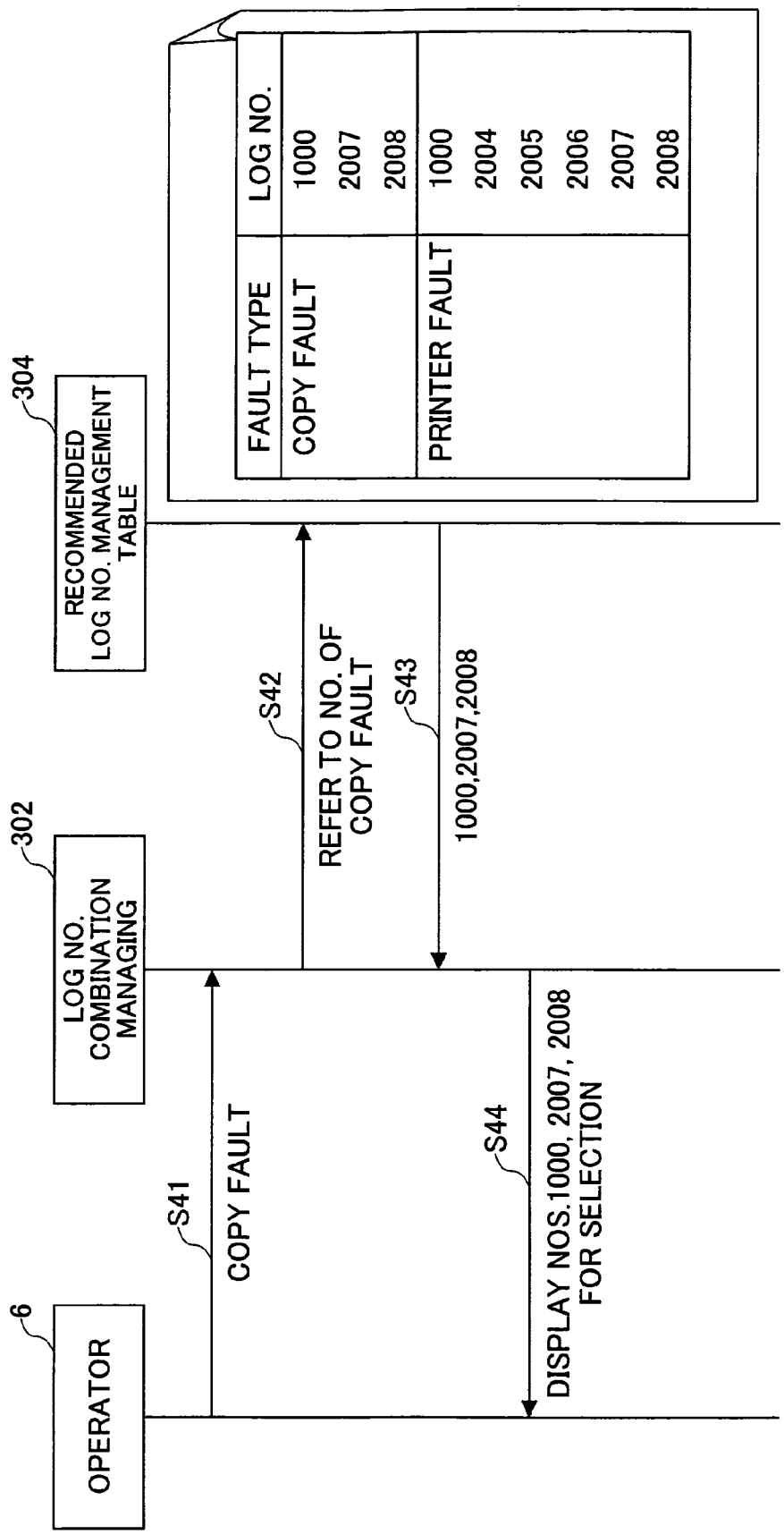
FIG. 19 is a sequence diagram showing a process of automatically selecting log numbers recommended depending on a type of fault.

FIG. 19 is a sequence diagram showing the process of automatically selecting log numbers recommended depending on the type of fault, for a case where the copy fault is specified.

In FIG. 19, when the operator 6 specifies "copy fault" (step S41), the log number combination managing part 302 of the log collecting tool 3 makes a reference to the recommended log number management table 304 (step S42), and acquires the log numbers corresponding to the "copy fault", such as "1000, 2007, 2008" (step S43). Then, the log number combination managing part 302 displays these log numbers "1000, 2007, 2008" corresponding to the "copy fault" to the operator 6 (step S44), and entrusts the judgement of the operator 6 on whether the log numbers "1000, 2007, 2008" are to be used as they are or are to be modified.

Figure 20:
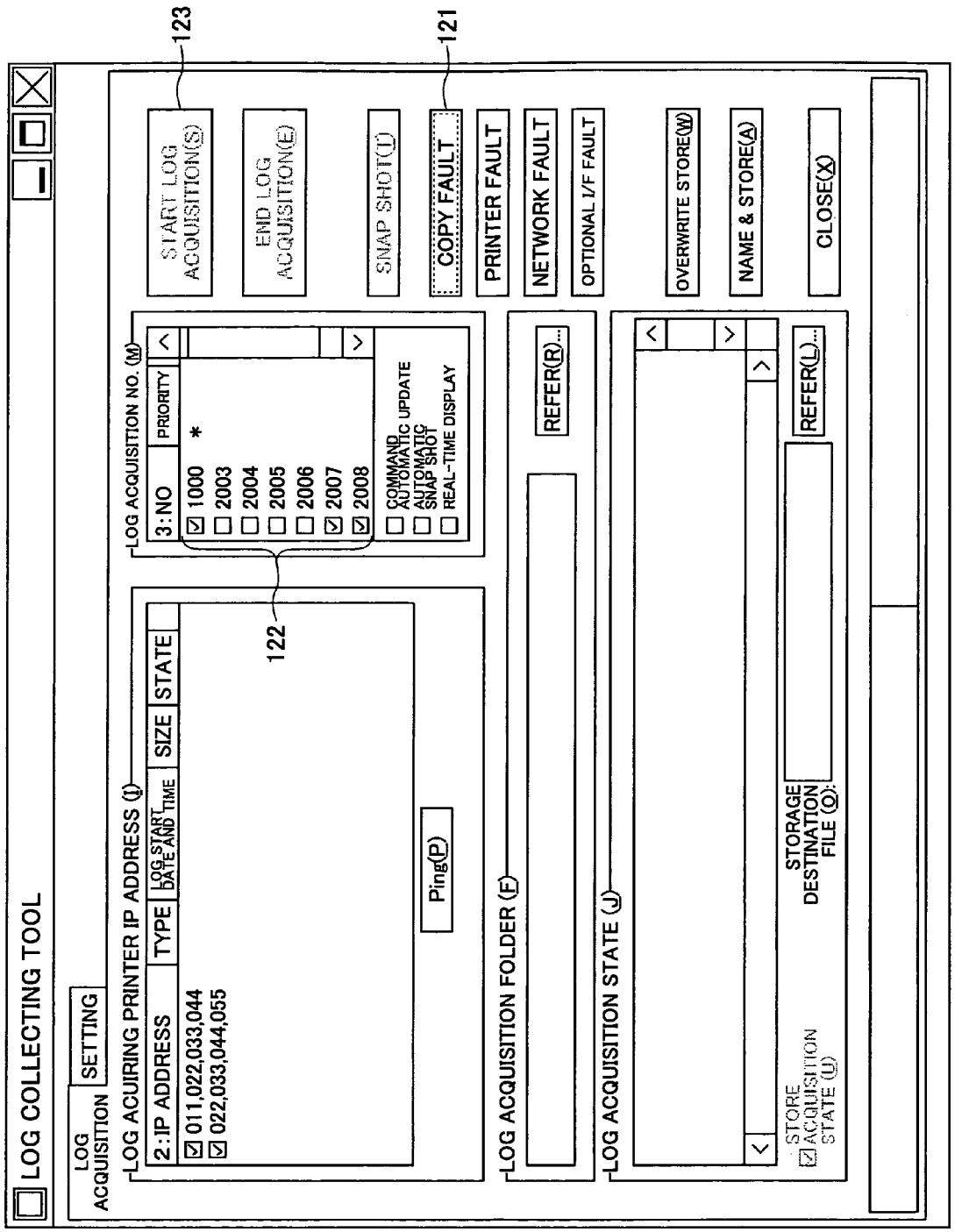
FIG. 20 is a diagram showing a screen when automatically selecting the log numbers recommended depending on the type of fault.

FIG. 20 is a diagram showing a screen when automatically selecting the log numbers recommended depending on the type of fault for this case.

In FIG. 20, when the operator pushes a "copy fault" button 121 on the tool screen of the GUI, the recommended log numbers for specifying the cause of the copy fault are automatically selected and acquired by the process described above in conjunction with FIG. 19, and displayed as log numbers 122.

After confirming the automatically selected log numbers, the operator maintains the log numbers 122 as they are or makes appropriate modifications, and then starts the log collection by pushing a log acquisition start button 123.

Figure 21:
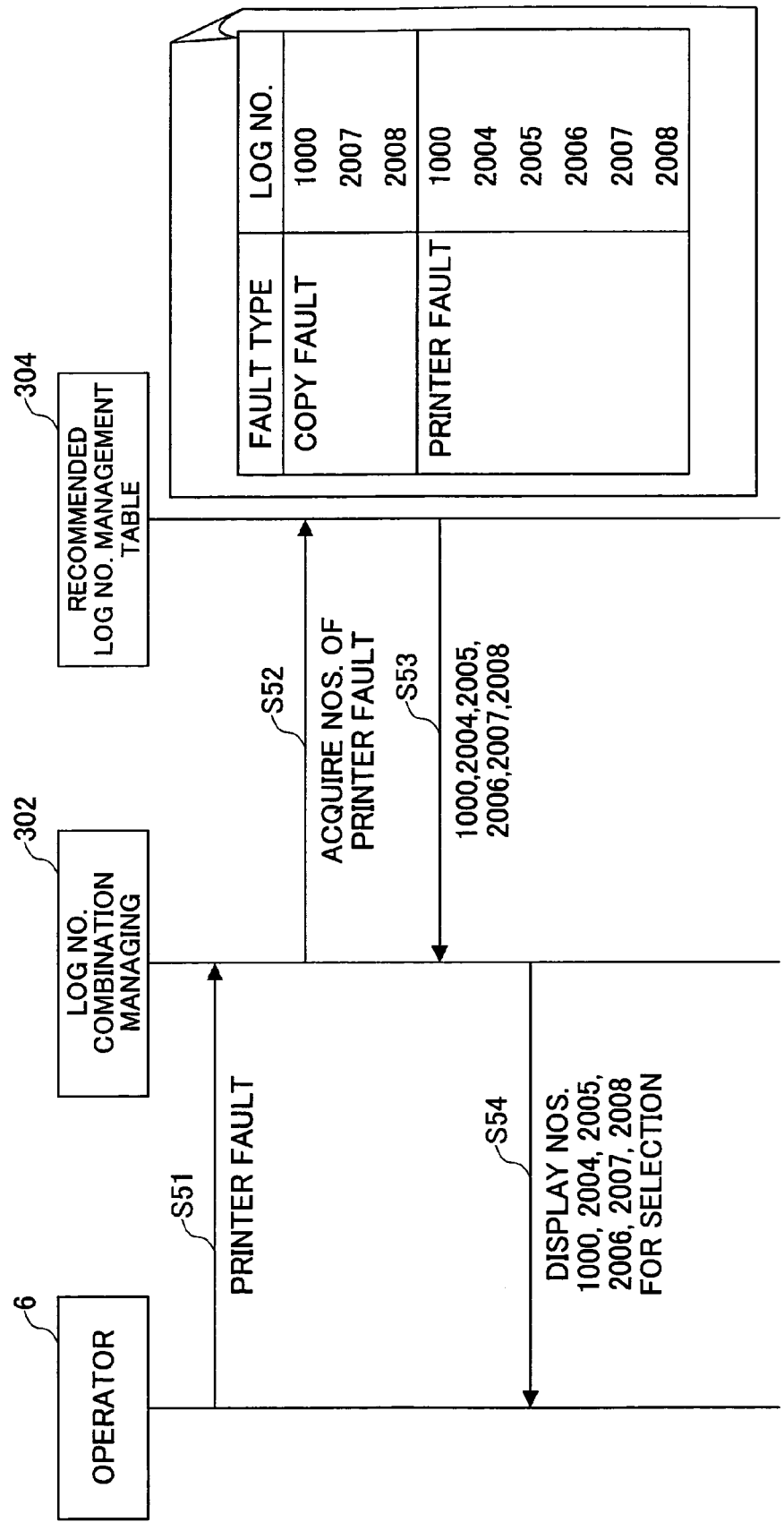
FIG. 21 is a sequence diagram showing another process of automatically selecting the log numbers recommended depending on the type of fault.

FIG. 21 is a sequence diagram showing another process of automatically selecting the log numbers recommended depending on the type of fault, for a case where the printer fault is specified.

In FIG. 21, when the operator 6 specifies "printer fault" (step S51), the log number combination managing part 302 of the log collecting tool 3 makes a reference to the recommended log number management table 304 (step S52), and acquires the log numbers corresponding to the "printer fault", such as "1000, 2004, 2005, 2006, 2007, 2008" (step S53). Then, the log number combination managing part 302 displays these log numbers "1000, 2004, 2005, 2006, 2007, 2008" corresponding to the "printer fault" to the operator 6 (step S54), and entrusts the judgement of the operator 6 on whether the log numbers "1000, 2004, 2005, 2006, 2007, 2008" are to be used as they are or are to be modified.

Figure 22:
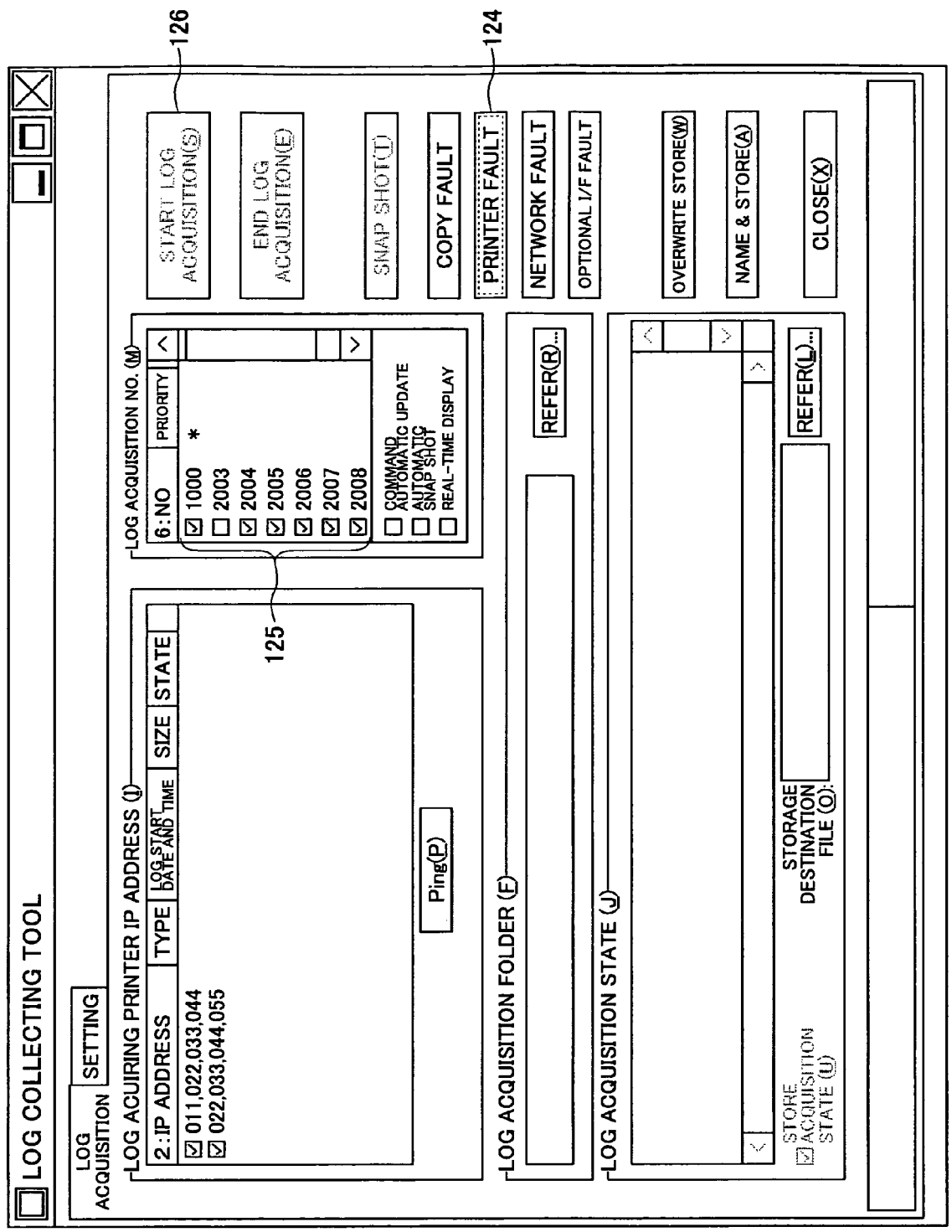
FIG. 22 is a diagram showing the screen when automatically selecting the log numbers recommended depending on the type of fault.

FIG. 22 is a diagram showing a screen when automatically selecting the log numbers recommended depending on the type of fault for this case.

In FIG. 22, when the operator pushes a "printer fault" button 124 on the tool screen of the GUI, the recommended log numbers for specifying the cause of the printer fault are automatically selected and acquired by the process described above in conjunction with FIG. 21, and displayed as log numbers 125.

After confirming the automatically selected log numbers, the operator maintains the log numbers 125 as they are or makes appropriate modifications, and then starts the log collection by pushing a log acquisition start button 126.

Therefore, by automatically selecting the recommended log numbers that are recommended depending on the type of fault, it becomes possible to collect the appropriate logs for specifying the cause of the fault, even for the service person who attends to the image forming apparatus at the site where the image forming apparatus is set up and does not have sufficient knowledge regarding the range of the logs to be acquired depending on the type of fault.

Figure 23:
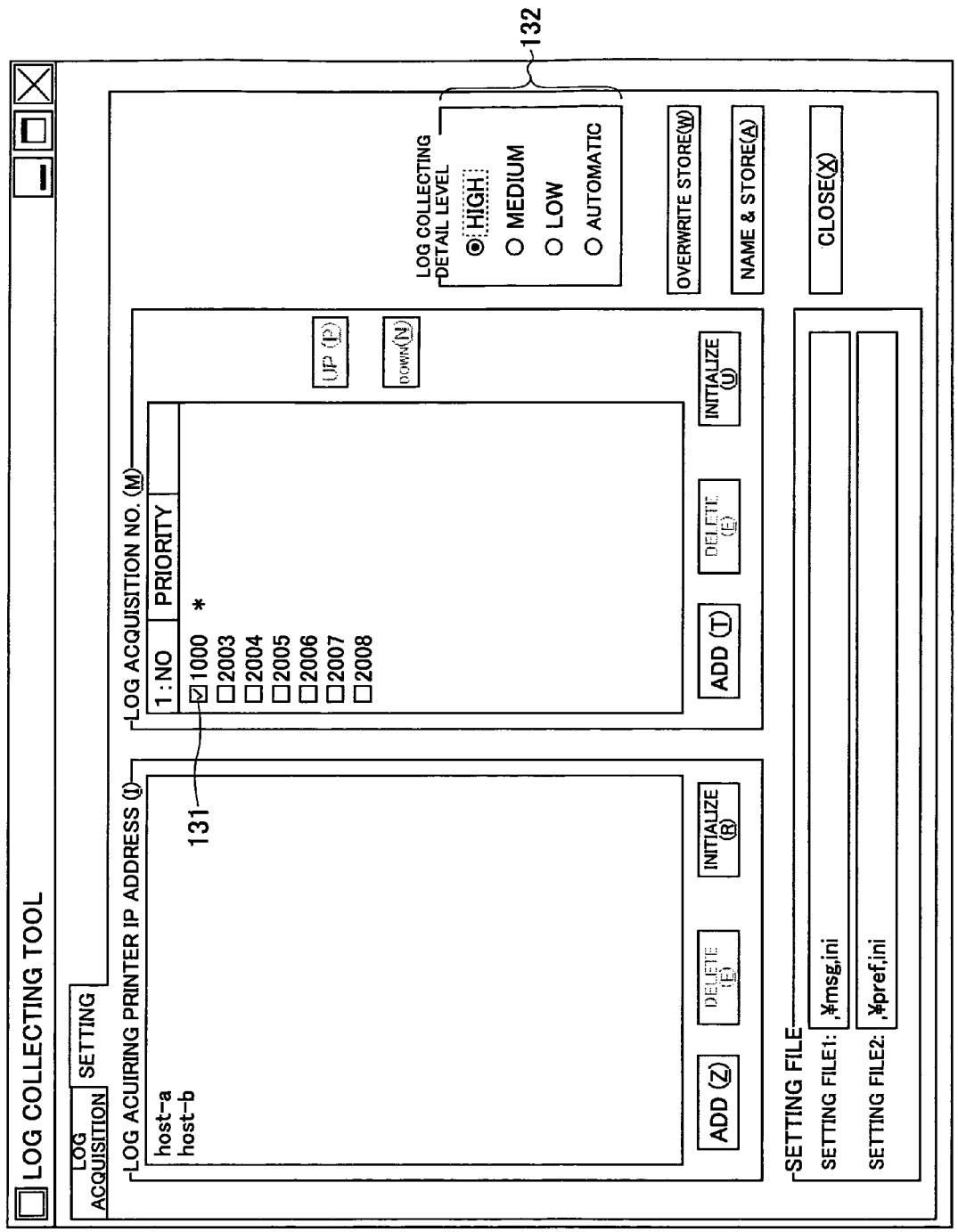
FIG. 23 is a diagram showing a screen when setting a log collecting detail level.

FIG. 23 is a diagram showing a screen when setting a log collecting detail level.

In FIG. 23, in a state where log numbers 131 of the logs to be collected are selected, a log collecting detail level (fineness or roughness) with which the logs are to be collected may be selected to "high", "medium" or "low" by a button 132 for specifying the log collecting detail level, under the management of the log collecting detail managing part 312 shown in FIG. 2. The log collecting detail levels include the "high" level, the "medium" level and the "low" level, and the largest number of logs are acquired when the log collecting detail level is the "high" level.

For example, the "high" log collecting detail level may be specified when the location of the fault cannot be specified, such as when starting a fault analysis. When the location of the fault can be specified to a certain extent, the log collecting detail level may be changed from "high" to "medium" or "low" to collect the logs.

The "medium" log collecting detail level may be specified when the fault analysis has progressed to a certain extent. For example, the "medium" log collecting detail level may be specified when too many logs are output to thereby make the fault analysis difficult if the "high" log collecting detail level is specified.

The "low" log collecting detail level may be specified when the fault analysis has progressed to a certain extent and the location of the fault can be specified to a certain extent. When the "low" log collecting detail level is specified, only the minimum required logs are output, such as whether or not the process has passed a check point.

FIG. 24 is a diagram showing a log that is output when the log collecting detail level is "high". FIG. 25 is a diagram showing a log that is output when the log collecting detail level is "medium". FIG. 26 is a diagram showing a log that is output when the log collecting detail level is "low". As shown in FIGS. 24 through 26, the number of logs that are output is the largest when the log collecting detail level is "high", and is the smallest when the log collecting detail level is "low".

In addition, in FIG. 23, in a state where the log numbers 131 of the logs to be collected have been selected, it is possible to automatically set the log collecting detail level (fineness or roughness) with which the logs are to be collected, by selecting "automatic" by the button 132 for specifying the log collecting detail level, under the management of the log collecting detail managing part 312 shown in FIG. 2.

For example, when the "automatic" log collecting detail level is specified, an external server or the like that is connected to the equipment or apparatus (the personal computer 1 or the image forming apparatus 5) having the log collecting tool 3 via a network analyzes the contents of the logs and dynamically changes the log collecting detail level. In general, the log collecting detail level is based on the amount of logs to be output.

Figure 27:
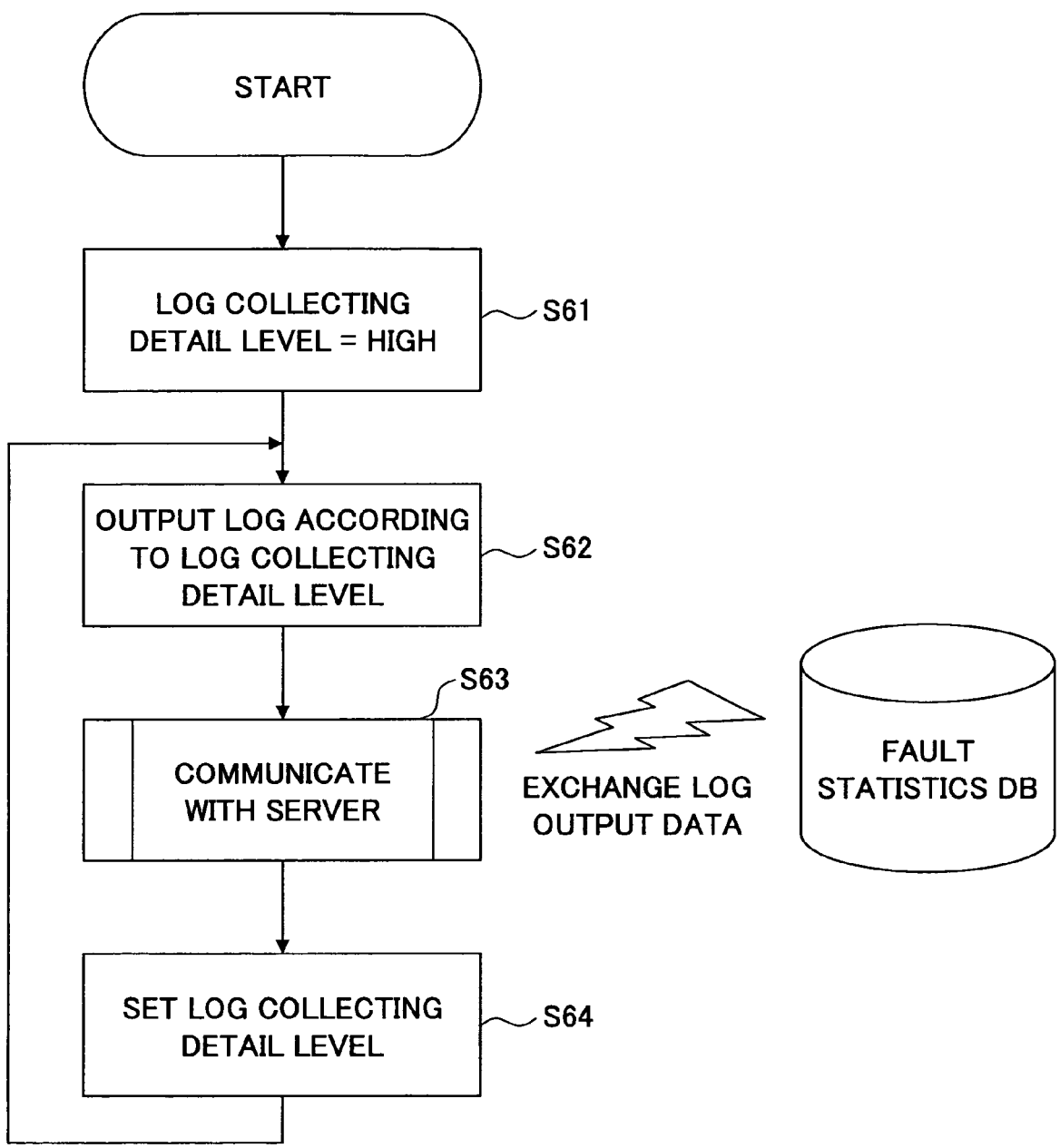
FIG. 27 is a flow chart for explaining a process of dynamically changing the log collecting detail level of the logs that are collected when the log collecting detail level is "automatic"

When the "automatic" log collecting detail level is specified, information such as a log output time, a timing (in relation to other logs) and contents (types and/or parameters) is taken into consideration to determine the log collecting detail level according to a logic shown in FIG. 27, for example.

FIG. 27 is a flow chart for explaining a process of dynamically changing the log collecting detail level of the logs that are collected when the log collecting detail level is "automatic". In the flow chart shown in FIG. 27, in a state where the log numbers 131 of the logs to be collected have been selected, a step S61 is carried out when the "automatic" is selected by the button 132 for specifying the log collecting detail level.

In the step S61, the log collecting detail managing part 312 automatically sets the log collecting detail level to "high". In a step S62, the logs are output according to the "high" log collecting detail level. In a step S63, the log collecting detail managing part 312 communicates with the external server or the like that is connected to the equipment or apparatus (the personal computer 1 or the image forming apparatus 5) having the log collecting tool 3 via the network, and determines the log collecting detail level by comparing the logs that are output and a fault statistics of the past stored in a fault statistics database (DB). Then, in a step S64, the log collecting detail managing part 312 sets the determined log collecting detail level, and the process returns to the step S62 to output logs according to the newly set log collecting detail level.

When the log collecting detail level is "automatic", the log collecting detail level does not necessarily have to be dynamically changed according to the "high", "medium" and "low" levels. For example, the external server or the like may judge the logs to be output based on the fault statistics of the past, and increase or decrease the logs that are necessary for the fault analysis in steps.

FIG. 28 is a diagram showing the logs that are output when the log collecting detail level is "automatic". Of the logs shown in FIG. 28, it is of course possible not to output the logs 1001 and 1002 that are judged as being unnecessary by the external server or the like.

Therefore, the "high" log collecting detail level is selected when detailed logs are necessary, and the "low" log collecting detail level is selected when rough logs are sufficient. In addition, the "medium" log collecting detail level is selected when an intermediate logs, between the detailed and rough logs, are necessary.

As mechanisms for changing the log detail depending on the log collecting detail level that is set, a mechanism may change the logs to be output depending on the specified log detail by a log output program portion of the DAEMON, and another mechanism may output the same logs but by adding flags according to the specified log details so that the logs that are output may be filtered based on the flags, that is, based on the specified log details.

The log collecting detail level may be specified from the log collecting tool 3 or from the image forming apparatus 5. The mechanism for specifying the log collecting detail level may be the same for the log collecting tool 3 and the image forming apparatus 5.

Figure 29:
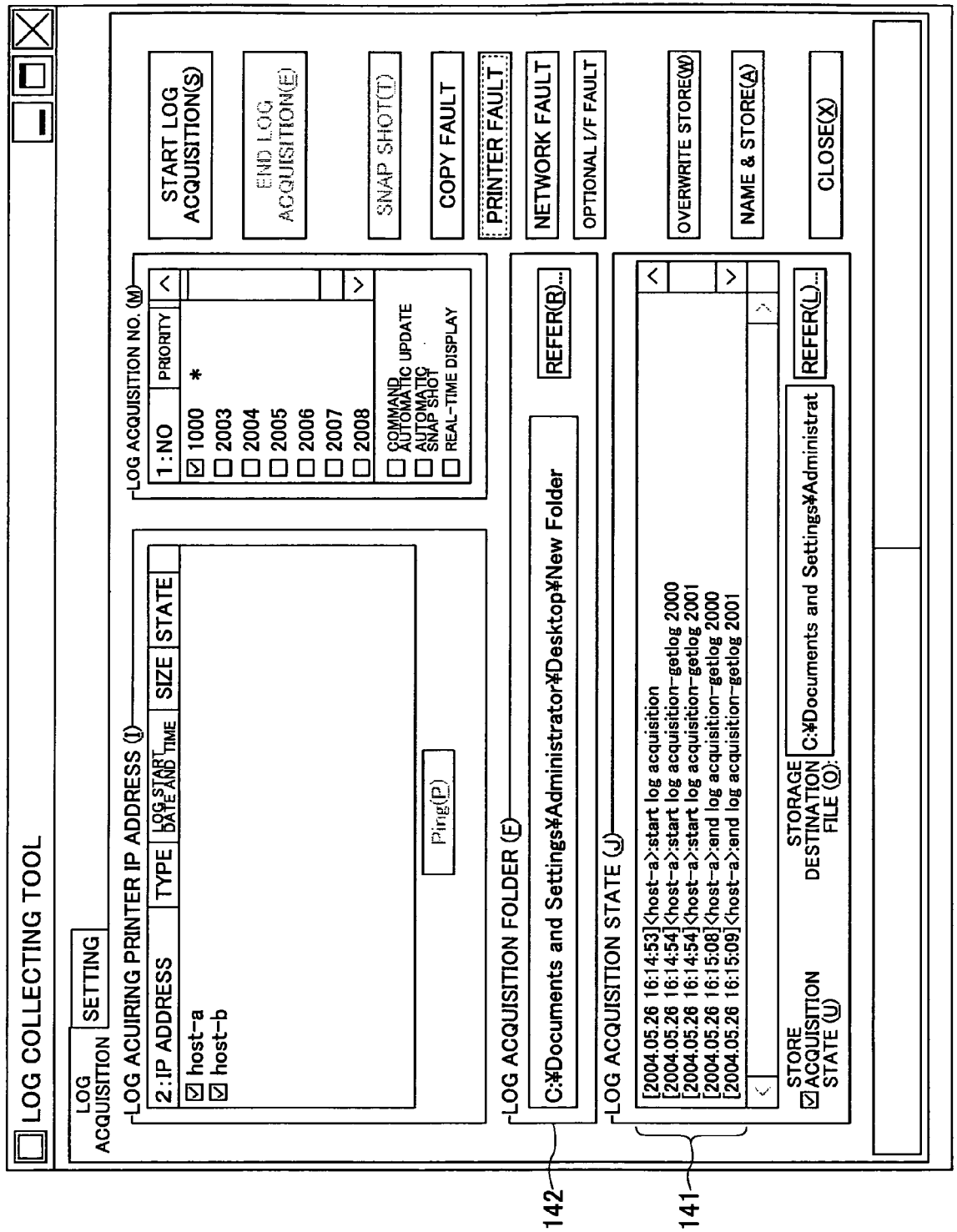
FIG. 29 is diagram showing a screen displaying a log acquisition state.

FIG. 29 is diagram showing a screen displaying a log acquisition state.

In FIG. 29, when the log acquisition is started, the date and time, target host (image forming apparatus), event (log acquisition start, log acquisition end and the like), target log number and the like are displayed in an area 141 as the log acquisition state. The collected logs are stored as a log file in a path specified in an area 142.

FIGS. 30A and 30B are diagrams showing a log collecting request and a response.

As shown in FIG. 30A, a request is made from the log collecting tool 3 to the image forming apparatus 5 via the network in a format such as "rsh host-a getlog 256". In this case, "host-a" indicates the address of the image forming apparatus 5 "getlog" indicates a log acquisition command, and "256" indicates the log number. Since the operator makes operations on the screen of the GUI, it is unnecessary to input the command such as that shown in FIG. 30A directly from the keyboard.

FIG. 30B shows the response with respect to the log collecting request shown in FIG. 30A. The response has different contents depending on the type or kind of log. The response is output every time an event is generated, until a stop command is input.

Figure 31:
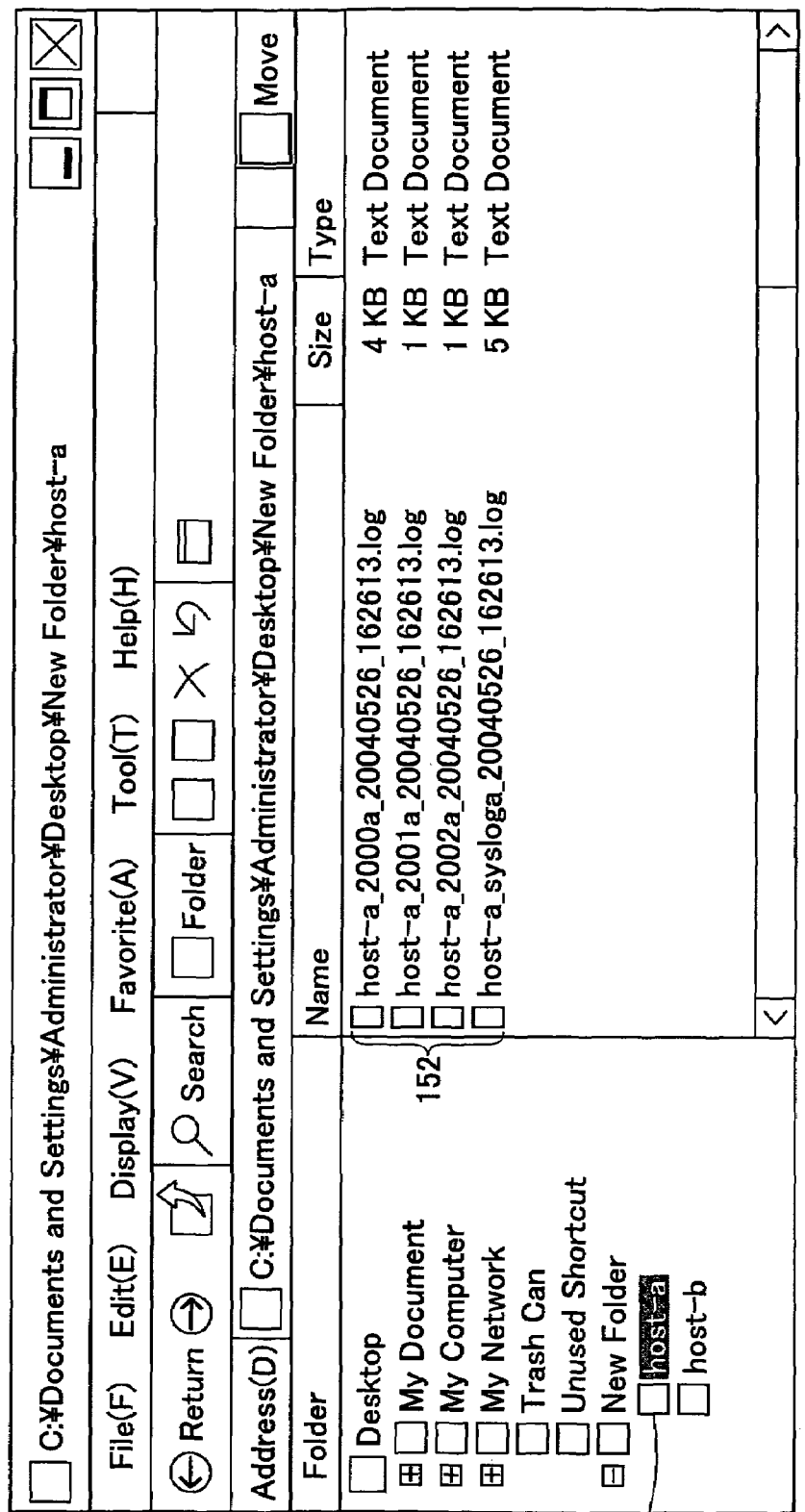
FIG. 31 is a diagram showing a screen when storing the collected logs.
Figure 32:
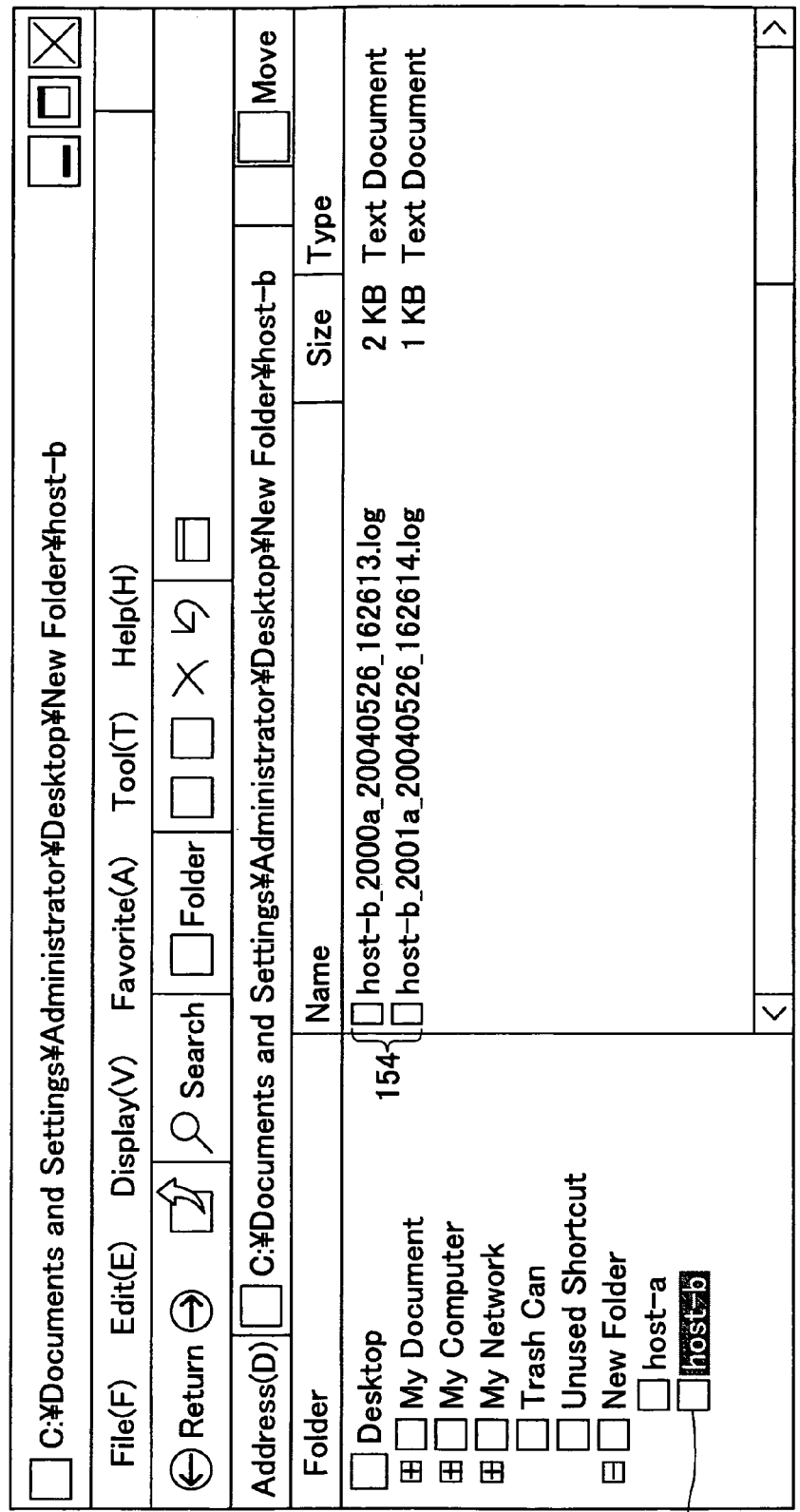
FIG. 32 is a diagram showing the screen when storing the collected logs.

FIGS. 31 and 32 are diagrams showing a screen when storing the collected logs. As shown in FIGS. 31 and 32, directories 151 and 153 are created for every host (image forming apparatus), and log files 152 and 154 are created thereunder for every log number and date.

FIG. 33 is a diagram showing a log file. The log file shown in FIG. 33 includes a header 161 that includes a date and time of the start of the log collection, a body 162 including the contents of the log, and a footer 163 including the date and time of the end of the log collection.

This application claims the benefit of Japanese Patent Applications No. 2004-250752 filed Aug. 30, 2004 and No. 2005-238754 filed Aug. 19, 2005, in the Japanese Patent Office, the disclosure of which is hereby incorporated by reference.

Further, the present invention is not limited to these embodiments, but various variations and modifications may be made without departing from the scope of the present invention.

What is claimed is:

1. A log collecting apparatus, comprising:
   a graphical user interface configured to allow an operator to select, on a screen, target equipment that is a target of log collection and to select, on the screen, logs that are to be collected;
   a storage unit configured to store the logs; and
   a combination managing part configured to identify related logs other than the logs selected on the screen using the graphical user interface that are related to the logs selected on the screen using the graphical user interface, and to make the identified related logs selectable on the screen using the graphical user interface,
   wherein the identified related logs include logs related to different programs running on the target equipment.

2. The log collecting apparatus as claimed in claim 1, wherein the combination managing part is configured to identify supported logs that are supported by the target equipment selected on the screen using the graphical user interface, and to make the supported logs selectable on the screen using the graphical user interface as collected logs.

3. The log collecting apparatus as claimed in claim 1, wherein the combination managing part is configured to identify supported logs that are supported by the target equipment that is selected on the screen using the graphical user interface and related logs other than the supported logs that are related to each of the supported logs, and to make the supported logs and the related logs selectable on the screen using the graphical user interface as collected logs.

4. The log collecting apparatus as claimed in claim 1, wherein:
   the graphical user interface includes a fault type selecting part configured to allow the operator to select, on the screen, a fault type of the equipment, and
   the combination managing part is configured to identify recommended logs depending on the selected fault type and to make the recommended logs selectable on the screen using the graphical user interface.

5. The log collecting apparatus as claimed in claim 1, wherein the graphical user interface includes a log collecting detail selecting part configured to allow the operator to select, on the screen, a number of logs to be collected, and further comprising:
   a log collecting detail managing part configured to adjust the number of logs to be collected depending on the selected number of logs to be collected.

6. The log collecting apparatus as claimed in claim 5, wherein the log collecting detail managing part is configured to analyze contents of the logs and to dynamically change a log collecting detail level depending on the contents of the logs, when an automatic log collecting detail level is selected on the screen.

7. A computer-readable storage medium which stores a program for causing a computer to function as:
   a graphical user interface configured to allow an operator to select, on a screen, target equipment that is a target of log collection and to select, on the screen, logs that are to be collected; and
   a combination managing part configured to identify related logs other than the logs selected on the screen using the graphical user interface that are related to the logs selected on the screen using the graphical user interface, and to make the identified related logs selectable on the screen using the graphical user interface,
   wherein the identified related logs include logs related to different programs running on the target equipment.

8. The computer-readable storage medium as claimed in claim 7, wherein the program causes the computer to function as the combination managing part that identifies supported logs that are supported by the target equipment selected on the screen using the graphical user interface, and makes the supported logs selectable on the screen using the graphical user interface as collected logs.

9. The computer-readable storage medium as claimed in claim 7, wherein the program causes the computer to function as the combination managing part that identifies supported logs that are supported by the target equipment that is selected on the screen using the graphical user interface and related logs other than the supported logs that are related to each of the supported logs, and makes the supported logs and the related logs selectable on the screen using the graphical user interface as collected logs.

10. The computer-readable storage medium as claimed in claim 7, wherein the program causes the computer to function as the graphical user interface that includes a fault type selecting part configured to allow the operator to select, on the screen, a fault type of the equipment, and causes the computer to function as the combination managing part that identifies recommended logs depending on the selected fault type and makes the recommended logs selectable on the screen using the graphical user interface.

11. The computer-readable storage medium as claimed in claim 7, wherein the program causes the computer to function as the graphical user interface that includes a log collecting detail selecting part configured to allow the operator to select, on the screen, a number of logs to be collected, and the program further causes the computer to function as:
   a log collecting detail managing part configured to adjust the number of logs to be collected depending on the selected number of logs to be collected.

12. The computer-readable storage medium as claimed in claim 11, wherein the program causes the computer to function as the log collecting detail managing part that analyzes contents of the logs and dynamically changes a log collecting detail level depending on the contents of the logs, when an automatic log collecting detail level is selected on the screen.

13. An image forming apparatus, comprising:
   a process part configured to carry out a process related to image formation that forms an image on a recording medium;

a notifying part configured to identify supported logs supported by the image forming apparatus when an external request requesting the logs supported by the image forming apparatus is received from an external apparatus via a network, and to notify the identified supported logs to the external apparatus; and a storage unit configured to store the identified logs, wherein the identified logs include logs related to different programs running on the image forming apparatus.

14. The image forming apparatus as claimed in claim 13, further comprising:

a part configured to adjust a number of logs to be collected depending on a log collecting detail level that indicates the number of logs to be collected, when the log collecting detail level is received from the external apparatus.

15. The image forming apparatus as claimed in claim 14, further comprising a part configured to analyze contents of logs and to dynamically change the log collecting detail level depending on the analyzed contents of the logs, when an automatic log collecting detail level is received.

16. An image forming apparatus, comprising:

a process part configured to carry out a process related to image formation that forms an image on a recording medium;

a notifying part configured to identify supported logs supported by the image forming apparatus and related logs other than the supported logs that are related to each of the supported logs, when an external request requesting the logs supported by the image forming apparatus is received from an external apparatus via a network, and to notify the identified supported logs and the related logs to the external apparatus; and a storage unit configured to store the identified supported logs, wherein the identified related logs include logs related to different programs running on the image forming apparatus.

17. The image forming apparatus as claimed in claim 16, further comprising:

a part configured to adjust a number of logs to be collected depending on a log collecting detail level that indicates the number of logs to be collected, when the log collecting detail level is received from the external apparatus.

18. The image forming apparatus as claimed in claim 17, further comprising a part configured to analyze contents of logs and to dynamically change the log collecting detail level depending on the analyzed contents of the logs, when an automatic log collecting detail level is received.

* * * * *